United States Patent
Dubois et al.

(10) Patent No.: US 6,319,979 B1
(45) Date of Patent: Nov. 20, 2001

(54) PACKAGE COMPRISING LOW APPLICATION TEMPERATURE HOT MELT ADHESIVE COMPRISING ETHYLENE α-OLEFIN

(75) Inventors: Robert A. Dubois, Houston; Cynthia L. Rickey, Lake Jackson, both of TX (US); Steven W. Albrecht, Forrest Lake, MN (US); Thomas F. Kauffman, Woodbury, MN (US); Beth M. Eichler, Saint Paul, MN (US); Maynard Lawrence, East Bethel, MN (US); Thomas H. Quinn, Saint Paul, MN (US)

(73) Assignees: The Dow Chemical Company, Midland, MI (US); H. B. Fuller Licensing & Financing, Inc., St. Paul, MN (US)

(*) Notice: Subject to any disclaimer, the term of this patent is extended or adjusted under 35 U.S.C. 154(b) by 0 days.

(21) Appl. No.: 09/496,973

(22) Filed: Feb. 2, 2000

Related U.S. Application Data (626062) Division of application No. 08/981,990, filed as application No. PCT/US97/12366 on Jul. 21, 1997, now Pat. No. 6,107,430, and a continuation-in-part of application No. 08/973,779, filed as application No. PCT/US97/04161 on Mar. 14, 1997.
(60) Provisional application No. 60/022,538, filed on Jul. 22, 1996, and provisional application No. 60/044,909, filed on Apr. 25, 1997.

(51) Int. Cl.⁷ .................. C08J 27/00; C08K 27/00; C08L 27/00
(52) U.S. Cl. ............... 524/570; 156/334; 206/813; 524/275; 524/277; 524/487; 524/488; 524/579; 525/210; 525/211; 525/216; 525/247; 526/248
(58) Field of Search ............... 524/270, 274, 524/275, 277, 478, 479, 487, 488, 489, 499, 570, 579; 525/210, 211, 216, 240; 526/348, 348.2, 348.3, 348.4, 348.5, 348.6, 348.7; 156/334; 206/813

(56) References Cited

U.S. PATENT DOCUMENTS 5,530,054 * 6/1996 Tse et al. ............... 524/487
5,548,014 * 8/1996 Tse et al. ............... 524/485

* cited by examiner

Primary Examiner—Peter Szekely
(74) Attorney, Agent, or Firm—Nancy N. Quan; Alan E. Wagner; Stephen P. Krupp

(57) ABSTRACT

Disclosed are packages, cartons, cases, and trays comprising a hot melt adhesive, in turn comprising at least one first homogeneous linear or substantially linear ethylene polymer having a particular density and melt viscosity at 350° F. (177° C.), up to 60 weight percent wax and up to 40 weight percent tackifier. In particular, disclosed are packages, cartons, cases, and trays comprising a hot melt adhesive characterized by:

a) at least one homogeneous linear or substantially linear interpolymer of ethylene with at least one $C_3$–$C_{20}$ α-olefin interpolymer having a density from 0.850 g/cm³ to 0.895 g/cm³; and b) up to 60 weight percent of at least one tackifying resin; and c) up to 40 weight percent of at least one wax, wherein the hot melt adhesive has a viscosity of less than about 5000 cPs (50 grams/(cm.second)) at 150° C.

20 Claims, 6 Drawing Sheets

PACKAGE COMPRISING LOW APPLICATION TEMPERATURE HOT MELT ADHESIVE COMPRISING ETHYLENE α-OLEFIN

This application is a divisional of patent application Ser. No. 08/981,990 filed Jan. 8, 1998, now granted as U.S. Pat. No. 6,107,430, filed Aug. 22, 2000, which is a 371 patent application of PCT US97/12366, filed Jul. 21, 1997, which claims priority to provisional patent application No. 60/022, 538, filed Jul. 22, 1996 and provisional patent application No. 60/044,909, filed Apr. 25, 1997: and a continuation-in-part of Ser. No. 08/973,779, filed Jan. 8, 1998 which is a 371 patent application of PCT/US97/04161 filed Mar. 14, 1997, which claims priority to patent application Ser. No. 08/615, 750 filed Mar. 14, 1996, now abandoned, and Ser. No. 08/619,406 filed Mar. 15, 1996, now abandoned.

The subject invention pertains to hot melt adhesives. In particular, the subject invention pertains to hot melt adhesives comprising at least one first ethylene polymer, and optionally at least one wax and/or tackifier. In particular, this invention relates to low viscosity hot melt adhesives comprising at least one homogeneous linear or substantially linear interpolymer of ethylene with at least one $C_3$–$C_{20}$ α-olefin, further characterized by each said interpolymer having a polydispersity less than 2.5. In preferred embodiments, the inventive hot melt adhesives may be applied at application temperatures of less than 150° C. These hot melt adhesives are particularly useful for case and carton sealing, and for tray forming applications in the packaging industry. Also disclosed is a dual reactor process for the preparation of such hot melt adhesives. Also disclosed are preferred hot melt adhesives for the bonding of cardboard or paperboard, as well as the resultant packaging articles comprising cardboard or paperboard which have been adhered by such hot melt adhesives.

Hot melt adhesives are used widely in the packaging industry for such applications as case and carton sealing, tray forming and box forming. The substrates to be bonded include virgin and recycled kraft, high and low density kraft, chipboard and various types of treated and coated kraft and chipboard. Composite materials are also used for packaging applications such as for the packaging of alcoholic beverages, These composite materials may include chipboard laminated to an aluminum foil which is further laminated to film materials such as polyethylene, mylar, polypropylene, polyvinylidene chloride, ethylene vinyl acetate and various other types of films. Additionally, these film materials also may be bonded directly to chipboard or kraft. The aforementioned substrates by no means represent an exhaustive list, as a tremendous variety of substrates, especially composite materials, find utility in the packaging industry.

Hot melt adhesives for packaging are generally extruded in bead form onto a substrate using piston pump or gear pump extrusion equipment. Hot melt application equipment is available from several suppliers including Nordson, ITW and Slautterback. Wheel applicators are also commonly used for applying hot melt adhesives, but are used less frequently than extrusion equipment.

Hot melts are required to have sufficient adhesion to substrates to firmly hold the package together, and in many cases, end users of hot melt adhesives require full fiber tearing bonds, meaning substantially all the fiber is removed from the substrate along the entire length of the adhesive application when the bond is separated by hand. Generally, in order to get full fiber tearing bonds, hot melts need to be applied at temperatures of 175° C. or greater. This increases the open time of the adhesive and lowers the viscosity for better penetration into the substrate. Open time refers to the amount of time that the adhesive can form a bond to the substrate.

In addition to bonding requirements, customers are demanding higher performance in other areas, such as thermal stability. Good thermal stability means that the product will not darken in the glue pot with prolonged exposure to high temperatures, will not produce char, skin or gel, and will not exhibit a substantial viscosity change over time. High application temperatures, along with exposure to oxygen, can increase the degradation of the hot melt adhesives. This problem is most commonly alleviated with the use of antioxidants such as Irganox® 565, 1010 and 1076, which are hindered phenolic antioxidants produced by Ciba-Geigy, located in Hawthorne, N.Y.

Another way to reduce char, skin, gel formation, discoloration and viscosity changes, is to lower the application temperature of the hot melt adhesive. In addition to improving thermal stability, lowering the application temperature also reduces the risk of severe burns to hot melt equipment operators, decreases the amount of electricity required to heat the adhesives which can result in energy cost savings, decreases maintenance costs, and reduces the amount of odors due to volatiles coming from the adhesives. Decreasing the odor and fumes coming from the adhesive is particularly appealing to customers, and to the employees who work in plants utilizing hot melt adhesives on a regular basis.

Hot melt adhesives are typically applied at temperatures of 175° C. For the aforementioned reasons, it is desirable to apply hot melt adhesives at temperatures of less than 155° C., and preferably from 135° C. to 150° C. Hot melt adhesives intended for application temperatures of less than 155° C., based on polymers such as ethylene n-butyl acrylate, ethylene vinyl acetate, and polyethylene, are known. Such adhesives generally employ lower melting point raw materials such as tackifying resins and waxes which tend to sacrifice important physical characteristics of the adhesive such as heat resistance. Lower application temperatures can also reduce the open time resulting in less penetration into the substrates and therefore poorer bondability of the hot melt adhesives.

Hot melt adhesives known in the art generally comprise three components: a polymer, a tackifier, and a wax. Each component may comprise a blend of two or more components, that is, the polymer component may comprise a blend of two different polymers. The polymer provides strength to the adhesive bond. The tackifier provides tack to the adhesive which serves to secure the items to be bonded while the adhesive sets, and reduces the viscosity of the system making the adhesive easier to apply to the substrate. The wax shortens the open/close times and reduces the viscosity of the system. Certain hot melt adhesives known in the art further comprise oil to reduce the viscosity of the system. Hot melt adhesives based on previously used polymers include ethylene vinyl acetate copolymers (EVA), atactic polypropylene (APP), low density polyethylene (LDPE), and homogeneous linear ethylene/α-olefin copolymers. Prior art hot melt adhesives typically employed large levels of tackifier to reduce the viscosity of the system to levels which enabled its facile application to the substrate, e.g., to viscosities less than about 5000 centipoise (50 grams/(cm.second)). However, the use of such tackifiers poses disadvantages, as tackifiers have the tendency to corrode equipment, are malodorous, and impede recyclability of paperboard bearing them.

Industry would find advantage in hot melt adhesives exhibiting good adhesion to both coated and uncoated paperboard, which adhesives exhibit good low temperature adhesion and/or high shear adhesion failure temperatures (SAFT). Industry would find particular advantage in hot melt adhesives which exhibit such properties, and, additionally, which minimize the use of tackifiers.

U.S. Pat. No. 5,041,482 to Ornsteen et al. issued Aug. 20, 1991 discloses glue stick adhesives for use in glue guns that can be applied at application temperatures in the range of 82° C. to 138° C., and preferably less than 121° C. Ornsteen discloses ethylene vinyl acetate, polyethylene and polypropylene polymers having melt indices in excess of 750 g/10 minutes. The exemplified glue stick adhesive compositions are high in viscosity, and thus unsuitable for piston pump or gear pump extrusion application equipment used widely in the packaging industry.

U.S. Pat. No. 5,373,049 to Ornstern et al. issued Dec. 13, 1994 teaches cool melt adhesives, again based on polyethylene, polypropylene and ethylene vinyl acetate.

U.S. Pat. No. 5,550,472 to Liedermooy et al. issued Mar.19, 1996 teaches a hot melt adhesive designed for low application temperature based on ethylene n-butyl acrylate copolymers having a melt index of at least 600 g/10 min., a terpene phenolic tackifying resin and a low melting point synthetic Fischer-Tropsch wax. It is suggested that small amounts, up to 20 percent by weight, of other polymeric additives such as typically known ethylene vinyl acetate, ethylene methyl acrylate, ethylene acrylic acid, polyethylene, polypropylene, poly-(butene-1-co-ethylene), and lower melt index ethylene n-butyl acrylate copolymers may be added.

European Pat. Application EP 0,721,006A1, published Jul. 10, 1996, teaches a hot melt packaging adhesive based on ethylene n-butyl acrylate copolymers having a melt index of at least 850 g/10 min. combined with a rosin ester tackifying resin and a microcrystalline or paraffin wax, which may also contain ethylene vinyl acetate copolymers, ethylene methyl acrylate copolymers, ethylene acrylic acid copolymers, polyethylene, polypropylene, poly-(butene-1-co-ethylene), and lower melt index ethylene n-butyl acrylate copolymers as a non-essential ingredient. The adhesive compositions exemplified exhibit fiber tear in the range of 35° C. to 40° C., are designed for freezer grade applications and lack high heat resistance.

U.S. Pat. No. 5,326,413, issued Jul. 5, 1994 to Esemplare et al., claims a hot melt adhesive comprising a polymer having a melt index of 300–500 dg/min per ASTM D1238, a specific wax, and a tackifier. This patent teaches the use of ethylene vinyl ester copolymers.

U.S. Pat. No. 5,397,843, issued Mar. 14, 1995 to Lakshmanan et al., teaches blended polymer compositions comprising a mixture of a copolymer of ethylene and an α-olefin and an amorphous polypropylene and/or amorphous polyolefin, or mixtures thereof. The examples set forth in Lakshmanan teach compositions with high concentrations, at least 42.5 percent by weight, of blended polymers. The single copolymer of ethylene and an α-olefin exemplified is "Flexomer 9042" from Union Carbide, having a 1-butene content of 15 percent by weight and a density of 0.900 g/cm³. These polyethylene type formulations tend to be stiff and to have poor cold temperature properties. In general, prior to the present invention, bonding capabilities of ethylene based hot melt adhesive compositions tended to be poor in comparison to ethylene vinyl acetate and ethylene n-butyl acrylate based hot melt adhesives. Although the use of amorphous polyolefins can improve flexibility, these polymers tend to be very cohesively weak due to inhomogeneous branch distribution, which also tends to cause unpredictable aging characteristics. Also, amorphous polyolefins tend to soften significantly at high temperatures, resulting in a loss of heat resistance and the possibility of bond failure during shipping and storage.

U.S. Pat. No. 5,530,054, issued Jun. 25, 1996 to Tse et al., claims a hot melt adhesive composition consisting essentially of: (a) 30 percent to 70 percent by weight of a copolymer of ethylene and about 6 percent to about 30 percent by weight of a $C_3$ to $C_{20}$ α-olefin produced in the presence of a catalyst composition comprising a metallocene and an alumoxane and having an $M_w$ of from about 20,000 to about 100,000; and (b) a hydrocarbon tackifier which is selected from a recited list. Exemplified are compositions consisting of 45 percent by weight of ethylene/butene-1 copolymer having a specific gravity of either 0.898 g/cm³ or 0.901 g/cm³. Since the exemplified formulations have a viscosity greater than about 10,000 cps (100 grams/(cm.second)) at 180° C. such formulations are not only unsuitable as low application temperature hot melt adhesives, but are typically unsuitable for use on extrusion type application equipment even at an application temperature of 180° C. Furthermore, exemplified formulas contain no more than 10 percent by weight of a low melting point paraffin wax which has little impact on the properties of the finished adhesive other than to lower the viscosity. Even the wax containing formulations exhibit a viscosity greater than about 10,000 cps (100 grams/(cm.second)) and range as high as 67,000 cps (670 grams/(cm.second)) at 180° C.

U.S. Pat. No. 5,548,014, issued Aug. 20, 1996 to Tse et al., claims a hot melt adhesive composition comprising a blend of ethylene/α-olefin copolymers wherein the first copolymer has a $M_w$ from about 20,000 to about 39,000 and the second copolymer has a $M_w$ from about 40,000 to about 100,000. Each of the hot melt adhesives exemplified comprises a blend of copolymers, with at least one of the copolymers having a polydispersity greater than 2.5. Furthermore, the lowest density copolymer exemplified has a specific gravity of 0.894 g/cm³. Exemplified are hot melt adhesives having a high viscosity ranging between 4,300 cps (43 grams/(cm.second)) and 180,000 cps (1800 grams/(cm.second)), with most of the examples being at least 10,000 cps (100 grams/(cm.second)) at 180° C., such formulations being too high in viscosity for use on standard hot melt extrusion type application equipment at low application temperatures.

Tse, in *Application of Adhesion Model for Developing Hot Melt Adhesives Bonded to Polyolefin Surfaces*, Journal of Adhesion, Vol. 48, Issue 1–4, pp. 149–167, 1995, notes that compared with hot melt adhesives based on ethylene-vinyl acetate copolymer, hot melt adhesives based on homogeneous linear ethylene/α-olefin interpolymers show higher viscosity and inferior tensile strength, but better bond strength to polyolefin surfaces, higher strain at break and lower yield stress.

Collectively, these references do not teach the use of low density homogeneous linear or substantially linear interpolymers for low application temperature hot melt adhesives. Nor do these references teach preferred hot melt adhesives for the bonding of cardboard or paperboard substrates. Furthermore, the packaging industry would find advantage in a low application temperature hot melt adhesive amenable to repulping operations having high heat resistance, improved cold temperature properties and excellent thermal stability. The present inventors have found that when formulated into hot melt adhesives, certain novel homogeneous linear or substantially linear ethylene/α-olefin interpolymers having a density from 0.850 g/cm$^3$ to 0.895 g/cm$^3$ can be employed in hot melt adhesives exhibiting improved adhesive performance properties with respect to the prior art.

The present invention relates to a hot melt adhesive comprising:

a) from 20 percent to 65 percent by weight in the adhesive of at least one homogeneous linear or substantially linear interpolymer of ethylene with at least one $C_3$–$C_{20}$ α-olefin having a polydispersity less than 2.5 and a density from 0.850 to 0.895 g/cm$^3$;

b) from 10 percent to 60 percent by weight of at least one tackifying resin; and c) from 0 to 40 percent by weight of a wax.

The homogeneous linear or substantially linear interpolymers preferably has a Brookfield™ melt viscosity (using a spindle 31 and a speed of 1.5 rpm) of from 2,000 cps (20 grams/(cm.second)) to 18,000 cps (180 grams/(cm.second)), more preferably from 5,000 to 17,000 cps (170 grams/(cm.second)), even more preferably from 7,000 cps (70 grams/(cm.second)) to 16,000 cps (160 grams/(cm.second)), and most preferably from 8,000 cps (80 grams/(cm.second)) to 15,000 cps (150 grams/(cm.second)). A blend of interpolymers which individually may have viscosities higher or lower than the preferred range can be used as long as the resultant blend exhibits a viscosity within the preferred range. These interpolymers preferably have densities of less than 0.895 g/cm$^3$, preferably less than 0.885 g/cm$^3$ and more preferably less than 0.875 g/cm$^3$. These interpolymers have densities of at least 0.850 g/cm$^3$, preferably at least 0.855 g/cm$^3$. The interpolymers may have densities higher or lower than the preferred range as long as the resulting blend has a density within the preferred range.

It is not a problem to obtain high heat resistance when employing a relatively low melt index polymer, as the molecular weight of the polymer contributes greatly to the heat resistance. However, for low application temperature hot melts, it is necessary to employ substantially less polymer or alternatively higher melt index polymers having a lower molecular weight. Consequently, due to these polymer compromises, high heat resistance has been difficult to achieve in combination with a low viscosity. Surprisingly, the adhesives of the present invention exhibit heat resistance in comparison with standard packaging grade hot melt adhesives designed for application temperatures of 177° C., while having viscosities which are amenable to application temperatures of less than 150° C.

The resultant hot melt adhesive has a viscosity of less than about 5,000 cps (50 grams/(cm.second)) at 150° C., preferably less than 3,500 cps (35 grams/(cm.second)) at 150° C. and more preferably less than about 2,000 cps (20 grams/(cm.second)) at 150° C. and can be applied at temperatures of less than about 150° C., and preferably at temperatures between 135° C. and 150° C. These adhesives can be applied using standard extrusion type hot melt application equipment such as those manufactured by Nordson Corp. in Atlanta, Ga. as well as by Mercer, Slautterback and ITW.

The novel adhesive composition of the present invention is further characterized as having a low density amenable to recycling and repulping processes. The hot melt adhesive of the present invention exhibits excellent heat resistance, having peel values (PAFT) greater than 40° C., preferably greater than 50° C. and more preferably greater than 60° C. and excellent cold temperature flexibility. This combination of properties causes the adhesive compositions of the present invention to be a significant improvement with respect to the state of the art for low application temperature packaging adhesives.

The subject invention further pertains to a hot melt adhesive useful to adhere two cardboard or paperboard faces comprising:

(a) 25–100 weight percent of a homogeneous linear or substantially linear ethylene polymer having a density of 0.880–0.895 g/cm$^3$ and a melt viscosity at 350° F. (177° C.) of from 3500 to 6000 centipoise (35 to 60 grams/(cm.second));

(b) 0–50 weight percent of a tackifier;

(c) 0–35 weight percent of a wax which is preferably selected from the group consisting of paraffinic wax, crystalline wax, homogenous wax having a density of 0.885–0.970 g/cm$^3$ and a melt viscosity at 350° F. (177° C.) of from 100 to 1000 centipoise (1 to 10 grams/(cm.second)), and combinations thereof; and with the proviso that when the tackifier is present in an amount less than 20 weight percent, the homogeneous linear or substantially linear ethylene polymer is present in an amount of at least 50 weight percent.

The subject invention further pertains to a hot melt adhesive useful to adhere two faces of cardboard or paperboard, comprising:

(a) 25 to 85 weight percent of a homogeneous linear or substantially linear ethylene polymer having a density of 0.865 to less than 0.875 g/cm$^3$ and a melt viscosity at 350° F. (177° C.) of from 3500 to 6000 centipoise (35 to 60 grams/(cm.second));

(b) 5 to 50 weight percent of a tackifier; and (c) 0 to 50 weight percent of a wax which is preferably selected from the group consisting of paraffinic wax, crystalline wax, homogenous wax having a density of 0.885 to 0.970 g/cm$^3$ and a melt viscosity at 350° F. (177° C.) of from 100–1000 centipoise (1 to 10 grams (cm.second)), and combinations thereof;

with the proviso that when the tackifier is present in an amount less than 20 weight percent, the polymer is present in an amount of at least 35 weight percent.

The subject invention further pertains to a hot melt adhesive useful to adhere two faces of cardboard or paperboard, comprising:

(a) 25 to 85 weight percent of a homogeneous linear or substantially linear ethylene polymer having a density of 0.860 to less than 0.880 g/cm$^3$ and a melt viscosity at 350° F. (177° C.) of from 1500 to less than 3500 centipoise (15 to 34 grams/(cm.second));

(b) 5 to 50 weight percent of a tackifier; and (c) 0 to 50 weight percent of a wax which is preferably selected from the group consisting of paraffinic wax, crystalline wax, homogenous wax having a density of 0.885 to 0.970 g/cm$^3$ and a melt viscosity at 350° F. (177° C.) of from 100–1000 centipoise (1 to 10 grams/(cm.second)), and combinations thereof;

with the proviso that when the tackifier is present in an amount less than 20 weight percent, the polymer is present in an amount of at least 35 weight percent.

The subject invention further pertains to a hot melt adhesive useful to adhere two faces of cardboard or paperboard, comprising:

(a) 25 to 85 weight percent of a homogeneous linear or substantially linear ethylene polymer having a density of 0.860 to less than 0.880 g/cm$^3$ and a melt viscosity at 350° F. (177° C.) of greater than 6000 centipoise (60 grams/(cm.second));

(b) 5 to 50 weight percent of a tackifier; and (c) 0 to 50 weight percent of a wax which is preferably selected from the group consisting of paraffinic wax, crystalline wax, homogenous wax having a density of 0.885 to 0.970 g/cm$^3$ and a melt viscosity at 350° F. (177° C.) of from 100–1000 centipoise (1 to 10 grams/(cm.second)), and combinations thereof.

The subject invention further pertains to a hot melt adhesive useful to adhere two faces of cardboard or paperboard, comprising:

(a) 40 to 85 weight percent of a homogeneous linear or substantially linear ethylene polymer having a density of 0.880 to 0.895 g/cm$^3$ and a melt viscosity at 350° F. (177° C.) of from 1,500 to less than 3500 centipoise (15 to less than 35 grams/(cm.second);

(b) 5 to 30 weight percent of a tackifier; and (c) 0 to 45 wt. percent of a wax which is preferably selected from the group consisting of paraffinic wax, crystalline wax, homogenous wax having a density of 0.885 to 0.970 g/cm$^3$ and a melt viscosity at 350° F. (177° C.) of from 100–1000 centipoise (1 to 10 grams/(cm.second)), and combinations thereof;

with the proviso that when the tackifier is less than 10 weight percent, the polymer is present in an amount of at least 50 weight percent.

The subject invention further pertains to a hot melt adhesive useful to adhere two faces of cardboard or paperboard, comprising:

(a) 30 to 85 weight percent of a homogeneous linear or substantially linear ethylene polymer having a density of 0.875 to less than 0.885 g/cm$^3$ and a melt viscosity at 350° F. (177° C.) of from 3,500 to 6,000 centipoise (35 to 60 grams/(cm.second);

(b) 0 to 50 weight percent of a wax which is preferably selected from the group consisting of paraffinic wax, crystalline wax, homogenous wax having a density of 0.885–0.970 g/cm$^3$ and a melt viscosity at 350° F. (177° C.) of from 100–1000 centipoise (1–10 grams/(cm.second)), and combinations thereof; and (c) 5 to 50 weight percent of a tackifier.

The subject invention further provides a polymerization process comprising:

a. reacting by contacting ethylene and at least $C_3$–$C_{20}$ α-olefins under solution polymerization conditions, in the presence of a constrained geometry catalyst composition, in at least one reactor, to produce a solution of a homogeneous linear or substantially linear polymer which is an interpolymer of ethylene and the at least one α-olefin, the homogeneous linear or substantially linear polymer being characterized as having a density of from 0.850 to 0.895 g/cm$^3$;

b. reacting by contacting ethylene and, optionally, at least $C_3$–$C_{20}$ α-olefin, under solution polymerization conditions, in the presence of a constrained geometry catalyst composition, in at least one other reactor, to produce a solution of a homogeneous wax having a density of 0.920 to 0.940 g/cm$^3$;

c. combining the solution of the first reactor with the solution of the second reactor to form a solution of a blend;

d. removing the solvent from the solution of a blend of step (c) and recovering the blend; and e. optionally introducing a tackifier into the reactor of step (a), the reactor of step (b), or at any point subsequent to the reacting of step (b);

wherein the resultant composition is characterized as having a viscosity of less than 5000 centipoise (50 grams/(cm.second)) at 150° C.

The subject invention further pertains to a packaging article, comprising two adjacent faces of cardboard or paperboard which have been adhered by any of the hot melt adhesives of the invention, and which are characterized as having at least 80 percent initial paper tear. Most preferred packaging articles will be adhered by any of the hot melt adhesives of the invention, and which are characterized as having at least 80 percent 14 day paper tear at room temperature, most preferably as having at least 80 percent 14 day paper tear at 50° C.

Unless indicated otherwise, the following testing procedures are to be employed:

Density is measured in accordance with ASTM D-792. The samples are annealed at ambient conditions for 24 hours before the measurement is taken.

Melt index ($I_2$), is measured in accordance with ASTM D-1238, condition 190° C./2.16 kg (formally known as "Condition (E)").

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min. and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in Journal of Polymer Science, Polymer Letters, Vol. 6, (621) 1968) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the ith fraction eluting from the GPC column.

Melt viscosity of polymer components is determined in accordance with the following procedure using a Brookfield Laboratories DVII+Viscometer in disposable aluminum sample chambers. The spindle used is a SC-31 hot-melt spindle, suitable for measuring viscosities in the range of from 10 to 100,000 centipoise (0.1 to 1000 grams/(cm.second)). A cutting blade is employed to cut samples into pieces small enough to fit into the 1 inch wide, 5 inches long (2.5 cm wide, 13 cm long) sample chamber. The sample is placed in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to 350° F. (177° C.), with additional sample being added until the melted sample is about 1 inch (2.5 cm) below the top of the sample chamber. The viscometer apparatus is lowered and the spindle submerged into the sample chamber. Lowering is continued until brackets on the viscometer align on the Thermosel. The viscometer is turned on, and set to a shear rate which leads to a torque reading in the range of 30 to 60 percent. Readings are taken every minute for about 15 minutes, or until the values stabilize, which final reading is recorded.

Melt Viscosity of the hot melt adhesives were determined on a Brookfield Thermosel Viscometer Model LVDV 2+using a number 21 spindle.

Peels and Shears (PAFT and SAFT) were determined by suspending 100 gram weights from the samples in the peel mode and 500 gram weights from the samples in the shear mode. The temperature was ramped from a starting temperature of 25° C. to an ending temperature of 100° C. at a rate of 25° C./hour. The oven automatically recorded the temperature at which the samples failed. Each sample was coated onto kraft paper by hand using glass rods or shims. The resultant coating is a one inch (2.5 cm) wide band that is 8–10 mils or 0.008 to 0.010 inches (2.0 to 2.5 cm) thick. A minimum of 8 samples were run for each adhesive. The adhesives of the invention were compared to commercially available compositions.

Bonding Tests were conducted as follows. Adhesive bonds were made on both high performance corrugated and on clay coated chipboard cartonstock using an application temperature of about 135° C., an open time of 1.5 seconds and a set time or compression time of 1.5 seconds and a bead size of 3/32 of an inch uncompressed (2.4 mm). The resulting bonds were then conditioned at about 40° F. (4.5° C.) for at least 24 hours, and then separated by hand and the amount of fiber tear based on a percentage of the total bond was determined. A minimum of six samples were tested for each adhesive. The adhesive performance was compared to two different commercially available compositions.

Heat Stability Tests were conducted as follows. A 250 gram sample of each of the adhesives was placed in a glass beaker which was then placed in a forced air oven at 275° F. (135° C.) and allowed to sit in the oven for 96 hours. A small portion of the adhesive, from about 10 gram to about 20 gram was removed from the beaker at 24, 48, 72 and 96 hours. Viscosity and Molten Gardner Colors were then recorded for each of the time intervals to monitor changes in the sample over time. The change in viscosity and Molten Gardner Color for 96 hours are reported herein.

Shear adhesion failure temperature (SAFT) for the hot melt adhesives of Examples 24–93 was measured in accordance with the following procedure. A one inch (2.5 cm by 2.5 cm) by one inch lap shear bond to case cartons using the indicated hot melt adhesive in its molten state is prepared. Samples are hung vertically in an air circulating oven at 30° C. with a given weight (typically a 500 gram weight) suspended from the bottom of the strip. The oven temperature is increased by 5° C. every 30 minutes until the adhesive bond fails. The shear-fail temperature is the average of three SAFT measurements.

Peel adhesion failure temperature (cantilever-mode) (PAFT c-mode) for the hot melt adhesives of Examples 24–93 was measured in accordance with the following procedure. A one inch by one inch (2.5 cm by 2.5 cm) lap shear bond to case cartons using the indicated hot melt adhesive in its molten state is prepared. Two metal beams are placed parallel to each other two inches apart. The prepared sample is laid across the beam with the 1 inch by 1 inch (2.5 cm by 2.5 cm) lap shear bond centered between the two beams. A 100 gram weight is placed on the 1 inch by 1 inch (2.5 cm by 2.5 cm) lap shear bond. The beams and samples are placed in an air circulating oven at 30° C. The oven temperature is increased by 5° C. every 30 minutes until the adhesive bond fails. The peel-fail temperature is the average of three PAFT measurements.

Open time is measured in accordance with the following procedure. The desired hot melt adhesive is melted at 350° F. (177° C.). An 11 inch by 4 inch (28 cm by 10 cm) piece of 24 pt Kraft "Post Tex Board", available from Huckster Packaging (Houston, Tex.), is placed clay side up. A 1 inch (2.5 cm) bead of the molten hot melt adhesive in placed onto the board. After five seconds, a 1 inch by 4 inch (2.5 cm by 10 cm) strip of the 24 pt Kraft "Post Tex Board" is placed fiber side down onto the bead of adhesive. The strip is immediately rolled with a 10 pound (3.7 kg) roller. Additional strips of the "Post Tex Board" are applied and rolled every five seconds, until no bond is made. The 11 inch by 4 inch (28 cm by 10 cm) board is held securely on both sides of the board. Beginning with the first applied strip, each strip is slowly peeled, until no paper tear is achieved. The time is seconds beyond which point paper tear is not uniformly achieved on the contacting part of the adhesive.

Close time is measured in accordance with the following procedure. The desired hot melt adhesive is melted at 350° F. (177° C.). An 11 inch by 4 inch (28 cm by 10 cm) piece of 24 pt Kraft "Post Tex Board", available from Huckster Packaging (Houston, Tex.), is placed clay side up. A 1 inch (2.5 cm) bead of the molten hot melt adhesive in placed onto the board. A 1 inch by 4 inch (2.5 cm by 10 cm) strip of the 24 pt Kraft "Post Tex Board" is placed fiber side down onto the bead and is immediately rolled with the 10 pound (3.7 kg) roller. After 5 seconds, the strip is peeled in the same manner as indicated in the measurement of Open Time. If paper tear is achieved, Close Time is 5 seconds or less. If paper tear is not achieved, the test is repeated, waiting 10 seconds before peeling away the strip. The test is continued until paper tear is achieved. Note, some samples have an infinite close time, such as pressure sensitive adhesives.

Paper tear is measure in accordance with the following procedure. The desired hot melt adhesive is melted at 350° F. (177° C.). An 11 inch by 4 inch (28 cm by 10 cm) piece of 24 pt Kraft "Post Tex Board", available from Huckster Packaging (Houston, Tex.), is placed clay side up. A 1 inch (2.5 cm) bead of the molten hot melt adhesive in placed onto the board. A 1 inch by 4 inch (2.5 cm by 10 cm) strip of the 24 pt Kraft "Post Tex Board" is placed fiber side down onto the bead and is immediately rolled with the 10 pound (3.7 kg) roller. In the case of initial paper tear, after 5 seconds, the strip is peeled in the same manner as indicated in the measurement of Open Time, with the amount of paper tear being visually observed. In the case of 14 day room temperature paper tear, the strip is maintained at room temperature for 14 days, and is then peeled in the same manner as indicated in the determination of initial paper tear. In the case of 14 day paper tear at 50° C., the strip is maintained at 50° C. for 14 days, and is then peeled in the same manner as indicated in the determination of initial and 14 day room temperature paper tear. In each case, the value reported is the average of three measurements.

Percent crystallinity may be calculated with the equation:

$$\text{percentC} = (A/292 \text{ J/g}) \times 100,$$

in which percentC represents the percent crystallinity and A represents the heat of fusion of the ethylene in Joules per gram (J/g) as determined by differential scanning calorimetry (DSC). Differential scanning calorimetry (DSC) data may be generated by placing each sample (5 mg) in an aluminum pan, heating the sample to 160° C., cooling the sample at 10° C./min and the recording the endotherm by scanning from −30° C. to 140° C. at 10° C./min using a Perkin Elmer DSC 7.

Figure 1:
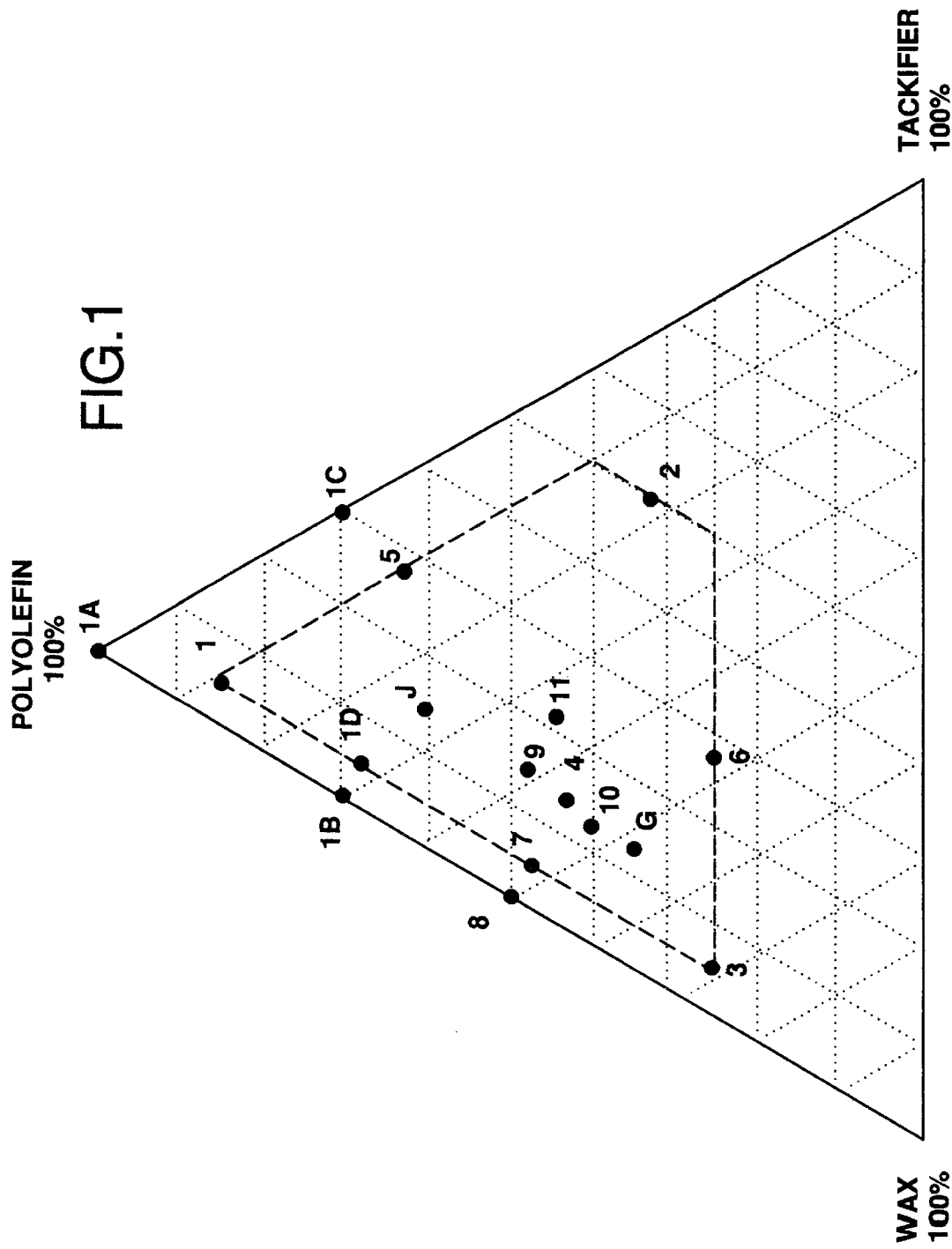
FIG. 1 is a three axis depiction of representative hot melt adhesives of the invention and of comparative hot melt adhesives.
Figure 2:
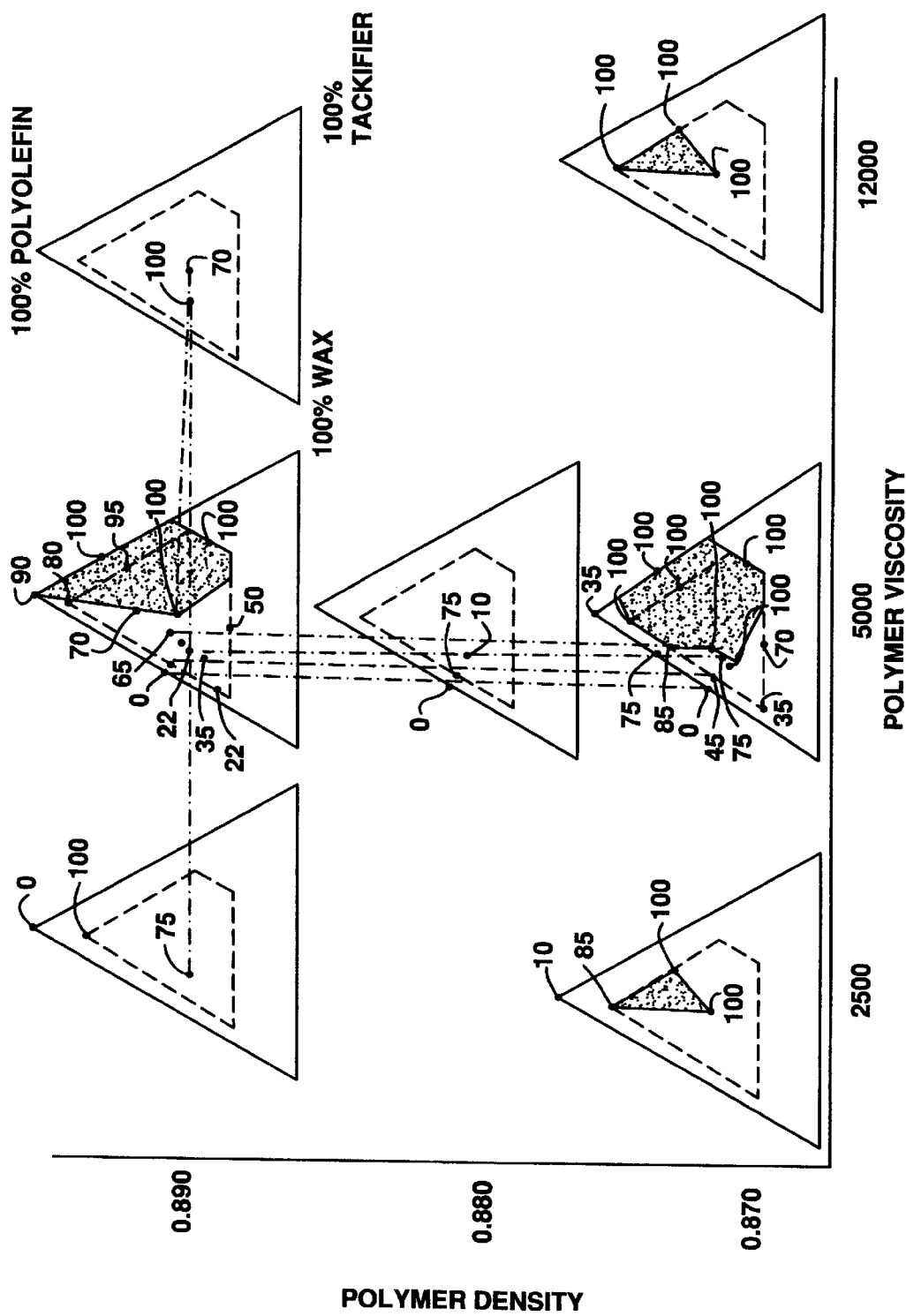
FIG. 2 is a graphical depiction of the average initial paper tear for representative hot melt adhesives of the invention and of comparative hot melt adhesives, with the points indicated corresponding to the points at the same relative location in the triangle of FIG. 1.
Figure 3:
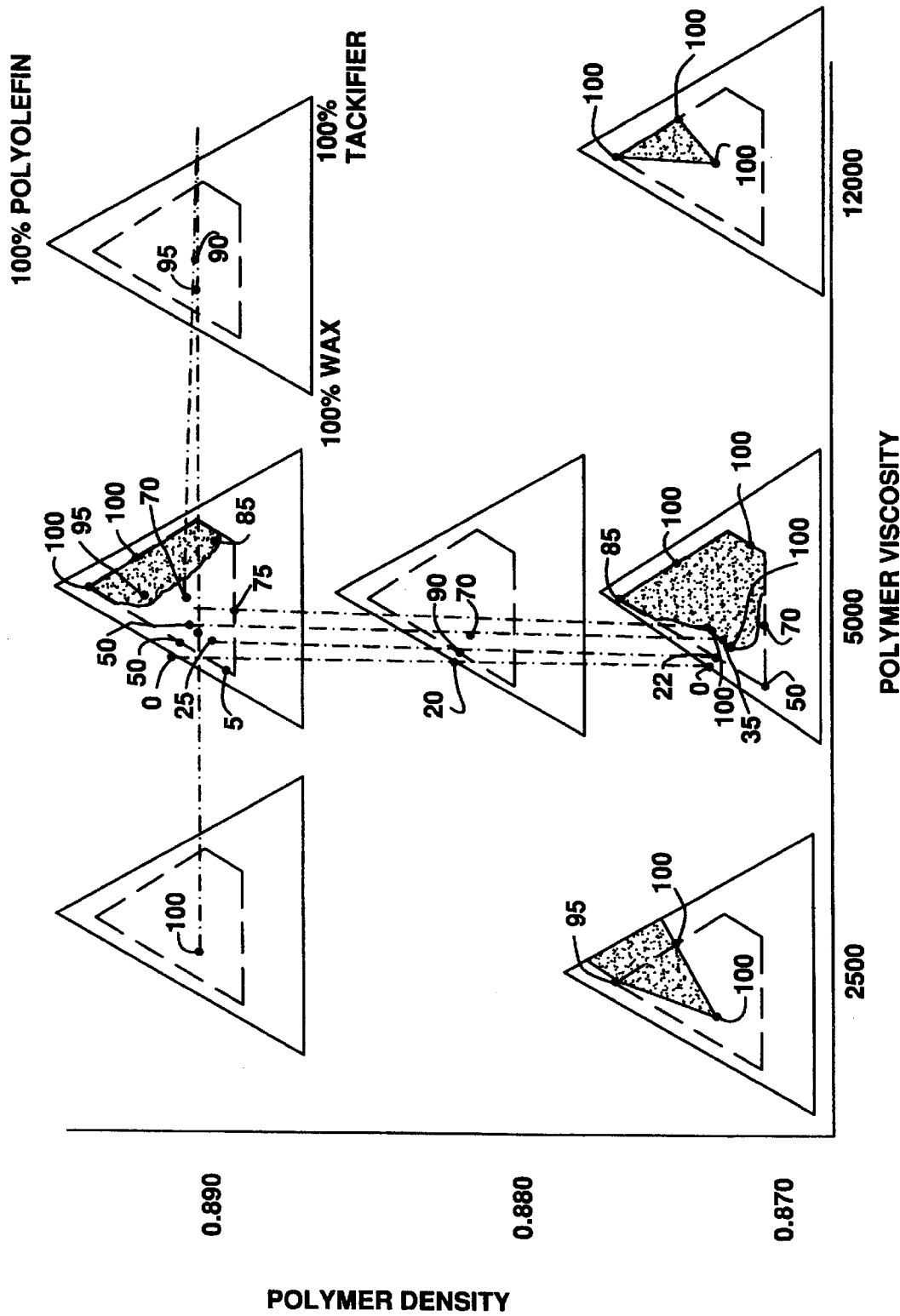
FIG. 3 is a graphical depiction of the average 14 day room temperature paper tear for representative hot melt adhesives of the invention and of comparative hot melt adhesives, with the points indicated corresponding to the points at the same relative location in the triangle of FIG. 1.
Figure 4:
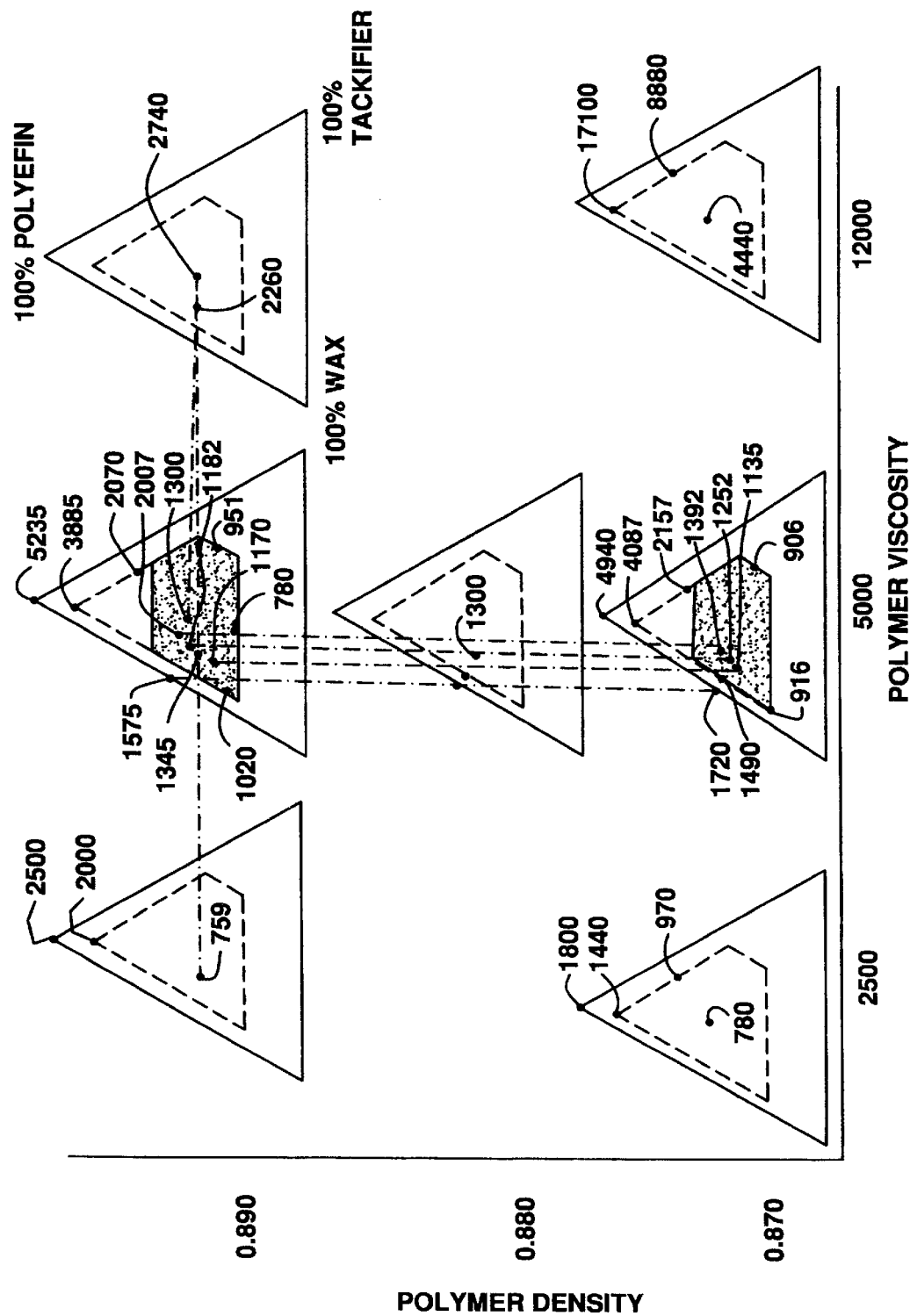
FIG. 4 is a graphical depiction of the average 14 day paper tear at 50° C. for representative hot melt adhesives of the invention and of comparative hot melt adhesives, with the points indicated corresponding to the points at the same relative location in the triangle of FIG. 1.
Figure 5:
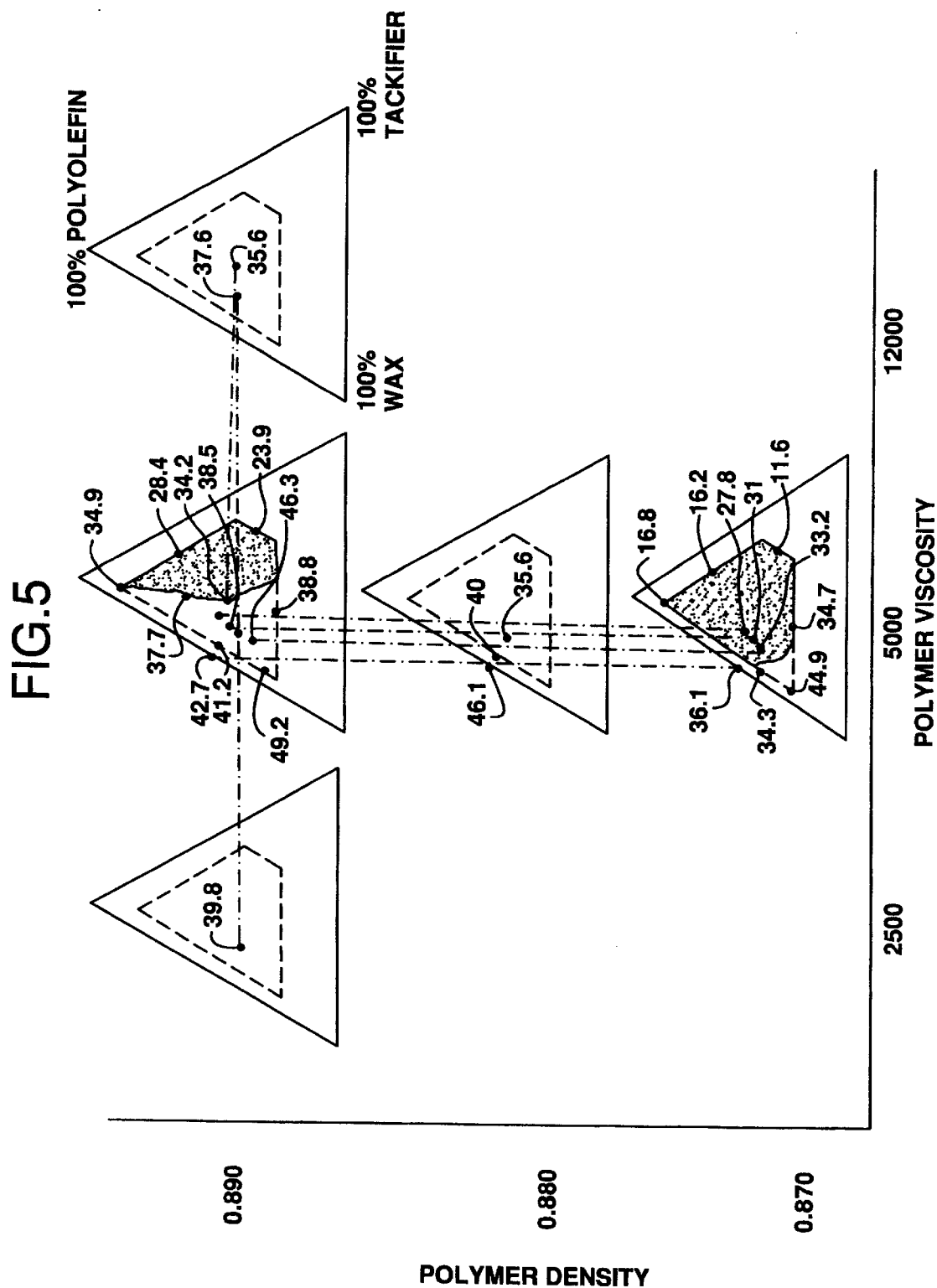
FIG. 5 is a graphical depiction of the percent crystallinity (as determined by differential scanning calorimetry (DSC)) of the formulation, for representative hot melt adhesives of the invention and of comparative hot melt adhesives, with the points indicated corresponding to the points at the same relative location in the triangle of FIG. 1.
Figure 6:
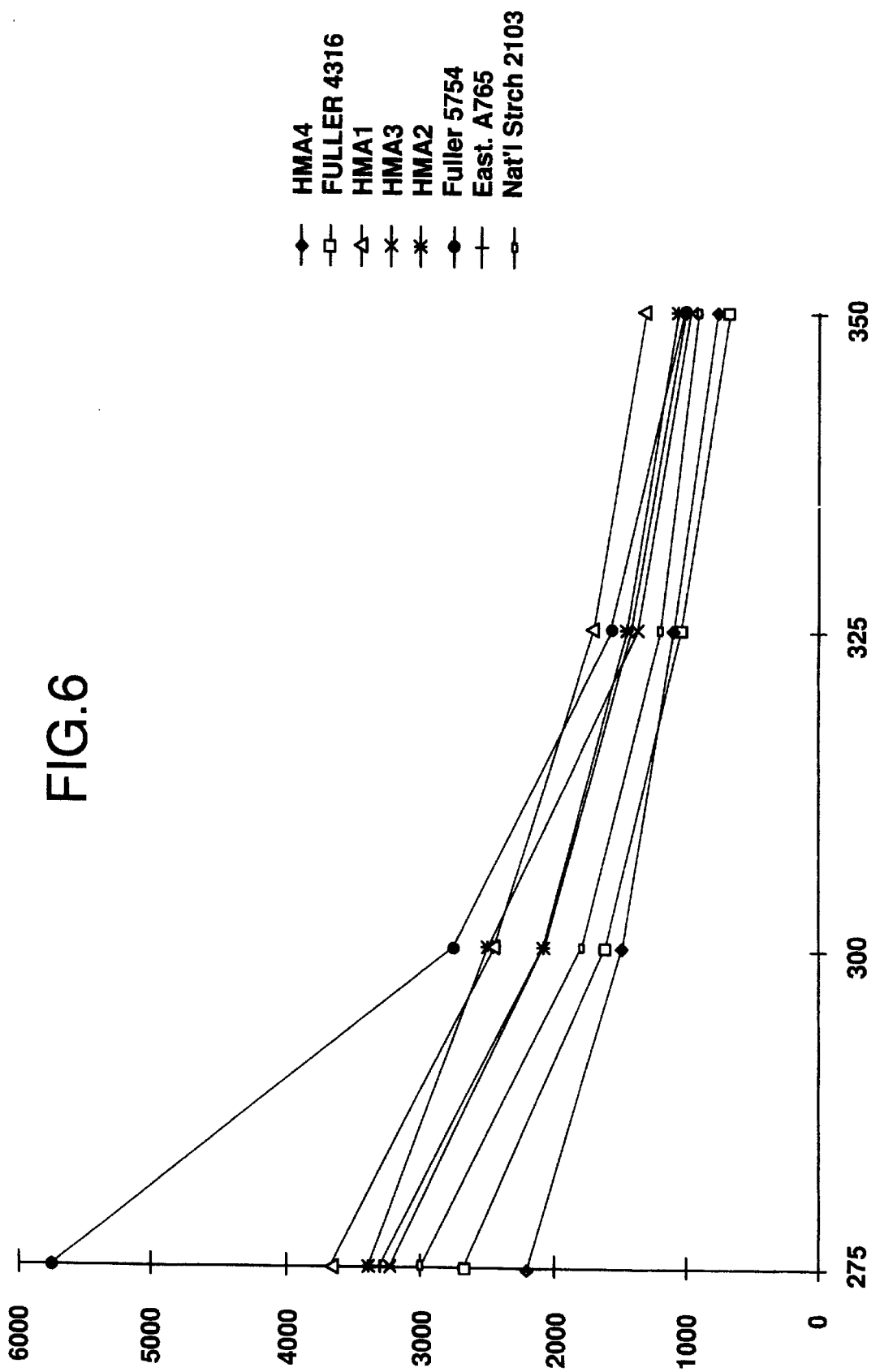
FIG. 6 is a plot of melt viscosity (centipoise) versus temperature for representative hot melt adhesives of the invention and of comparative commercial hot melt adhesives.

The hot melt adhesives of the invention comprise at least one homogeneous linear or substantially linear polymer which is an interpolymer of ethylene and at least one $C_3$–$C_{20}$ α-olefin, and optionally at least one wax and/or tackifier.

The term "interpolymer" is used herein to indicate a copolymer, or a terpolymer, or the like. That is, at least one other comonomer is polymerized with ethylene to make the interpolymer.

The homogeneous linear or substantially linear polymer is an ethylene polymer prepared using a constrained geometry or single site metallocene catalyst. By the term homogenous, it is meant that any comonomer is randomly distributed within a given interpolymer molecule and substantially all of the interpolymer molecules have the same ethylene/ comonomer ratio within that interpolymer. The melting peak of homogeneous linear and substantially linear ethylene polymers, as determined by differential scanning caloumetry (DSC), will broaden as the density decreases and/or as the number average molecular weight decreases. However, unlike heterogeneous polymers, when a homogeneous polymer has a melting peak greater than 115° C. (such as is the case of polymers having a density greater than 0.940 g/cm$^3$), such polymers typically do not additionally have a distinct lower temperature melting peak.

The homogeneous linear or substantially linear ethylene polymers are characterized as having a narrow molecular weight distribution ($M_w/M_n$). For the linear and substantially linear ethylene polymers, the $M_w/M_n$ is preferably from 1.5 to 2.5, preferably from 1.8 to 2.2.

It is important to note that the ethylene polymers useful in the invention differ from low density polyethylene prepared in a high pressure process. In one regard, whereas low density polyethylene is an ethylene homopolymer having a density of from 0.900 to 0.935 g/cm$^3$, the ethylene polymers useful in the invention require the presence of a comonomer to reduce the density to the range of from 0.900 to 0.935 g/cm$^3$.

Substantially linear ethylene polymers are homogeneous polymers having long chain branching. The long chain branches have the same comonomer distribution as the polymer backbone and can be as long as about the same length as the length of the polymer backbone. When a substantially linear ethylene polymer is employed in the practice of the invention, such polymer will be characterized as having a polymer backbone substituted with from 0.1 to 3 long chain branches per 1000 carbons.

Methods for determining the amount of long chain branching present, both qualitatively and quantitatively, are known in the art.

For qualitative methods for determination, see, e.g., U.S. Pat. Nos. 5,272,236 and 5,278,272, which disclose the use of an apparent shear stress vs. apparent shear rate plot to identify melt fracture phenomena. Substantially linear ethylene polymers will possess a gas extrusion rheology such that: (a) the critical shear rate at the onset of surface melt fracture for the substantially linear ethylene polymer is at least 50 percent greater than the critical shear rate at the onset of surface melt fracture for a linear ethylene polymer having the same comonomer or comonomers and having an $I_2$, $M_w/M_n$ and density within ten percent of that of the substantially linear ethylene polymer, and wherein the respective critical shear rates of the substantially linear ethylene polymer and the linear ethylene polymer are measured at the same melt temperature using a gas extrusion rheometer; or (b) the critical shear rate at the onset of gross melt fracture is greater than 4×10$^6$ dynes/cm$^2$ (0.4 MPa), as determined by gas extrusion rheometry.

For quantitative methods for determination, see, for instance, U.S. Pat. Nos. 5,272,236 and 5,278,272; Randall (Rev. Macromol. Chem. Phys., C29 (2&3), p. 285–297), which discusses the measurement of long chain branching using 13C nuclear magnetic resonance spectroscopy, Zimm, G. H. and Stockmayer, W. H., J. Chem. Phys., 17, 1301 (1949); and Rudin, A., Modern Methods of Polymer Characterization, John Wiley & Sons, New York (1991) pp. 103–112, which discuss the use of gel permeation chromatography coupled with a low angle laser light scattering detector (GPC-LALLS) and gel permeation chromatography coupled with a differential viscometer detector (GPC-DV).

Substantially linear ethylene polymers are further characterized as having a melt flow ratio ($I_{10}/I_2$) which may be varied independently of the polydispersity index, that is, the molecular weight distribution $M_w/M_n$. This feature accords substantially linear ethylene polymers with a high degree of processability despite a narrow molecular weight distribution.

The homogeneous linear or substantially linear ethylene polymer will be an interpolymer of ethylene with at least one α-olefin. Preferred are interpolymers of ethylene with at least one $C_3$-$C_{20}$ α-olefin (for instance, propylene, isobutylene, 1-butene, 1-pentene, 1-hexene, 4-methyl-1-pentine, and 1-octene), with interpolymers of ethylene with at least one $C_4$–$C_{20}$ α-olefin, particularly at least one $C_6$–$C_8$ α-olefin, being most preferred.

The homogeneous linear or substantially interpolymer of ethylene useful herein are those having a density of less than 0.895 g/cm$^3$, preferably less than 0.885 g/cm$^3$ and more preferably less than 0.875 g/cm$^3$; greater than 0.850 g/cm$^3$ and preferably greater than 0.855 g/cm$^3$. When 1-octene is employed as the comonomer, preferably the 1-octene is present in an amount greater than 31 percent by weight in the polymer as measured by NMR in accordance with ASTM D-5017. More preferably the 1-octene comonomer content of the interpolymer is greater than 33 percent by weight and most preferably greater than 35 percent by weight.

Preferably, the adhesive composition comprises a homogeneous linear or substantially linear interpolymers which is characterized as having a narrow molecular weight distribution with a polydispersity ($M_w/M_n$) less than about 2.5, preferably from about 1.5 to 2.5, and more preferably from 1.8 to 2.2, as determined by gel permeation chromatography.

The melt index ($I_{22}$ at 190° C.) of the homogeneous linear or substantially linear ethylene polymer is preferably from 200 to 2000 g/10 min., more preferably from 500 to 1500 g/10 min., and most preferably from 800 to 1200 g/10 min.

The homogeneous linear or substantially linear interpolymers preferably exhibits a Brookfield™ melt viscosity at 350° F. (177° C.) (using a spindle 31 and a speed of 1.5 rpm) of from 2,000 cps (20 grams/(cm.second)) to about 18,000 cps (180 grams/(cm.second)), preferably from 5,000 cps (50 grams/(cm.second)) to 17,000 cps (170 grams/(cm.second)), more preferably from 7,000 cps (70 grams/(cm. second)) to 16,000 cps (160 grams/(cm. second)), and most preferably from 8,000 cps (80 grams/(cm.second)) to 15,000 cps (150 grams/(cm.second)). Melt viscosity is a preferable expression to melt index for accurately describing very high melt index polymers.

In another embodiment the present invention may comprise a blend of interpolymers wherein the resultant blend of interpolymers has a density of less than 0.895 g/cm$^3$, preferably less than 0.885 g/cm$^3$ and more preferably less than 0.875 g/cm$^3$; greater than 0.850 g/cm$^3$, and preferably greater than 0.855 g/cm$^3$. The resultant blend has a viscosity from 5,000 cps (50 grams/(cm.second)) to 18,000 cps (180 grams/(cm.second)), preferably from 7,000 cps (70 grams/(cm.second)) to 16,000 cps (160 grams/(cm. second)) and more preferably from 8,000 cps (80 grams/(cm.second)) to 15,000 cps (150 grams/(cm.second)). Each interpolymer may therefore have a density and/or viscosity/melt index outside the preferred range provided the resultant blend of interpolymers has a density and a viscosity or melt index within the preferred range.

The homogeneous linear or substantially linear ethylene polymer, in preferred hot melt adhesive formulations, will preferably have an ultra-low molecular weight, that is, such polymers will have a number average molecular weight (Mn) of no more than 11,000.

Ultra-low molecular weight ethylene/(α-olefin interpolymers are especially advantageous in the present application, as they lead to a low polymer and formulation viscosity but are characterized by a peak crystallization temperature which is greater than that of corresponding higher molecular weight materials of the same density. In hot melt adhesive applications, the increase in peak crystallization temperature translates to decreased close times, as the materials begins to crystallize from the hot melt more rapidly.

Homogeneously branched linear ethylene/α-olefin interpolymers may be prepared using polymerization processes (such as is described by Elston in U.S. Pat. No. 3,645,992) which provide a homogeneous short chain branching distribution. In his polymerization process, Elston uses soluble vanadium catalyst systems to make such polymers. However, others such as Mitsui Petrochemical Company and Exxon Chemical Company have used so-called single site metallocene catalyst systems to make polymers having a homogeneous linear structure. Homogeneous linear ethylene/α-olefin interpolymers are currently available from Mitsui Petrochemical Company under the tradename "Tafmer" and from Exxon Chemical Company under the tradename "Exact".

Substantially linear ethylene/α-olefin interpolymers are available from The Dow Chemical Company as Affinity™ polyolefin plastomers. Substantially linear ethylenelα-olefin interpolymers may be prepared in accordance with the techniques described in U.S. Pat. No. 5,272,236 and in U.S. Pat. No. 5,278,272.

Ultra-low molecular weight polymers may be made in accordance with the Examples herein and with the procedures set forth below.

The first polymer may be suitably prepared using a constrained geometry metal complex, such as are disclosed in U.S. application Ser. No. 545,403, filed Jul. 3, 1990 (EP-A416,815); U.S. application Ser. No. 702,475, filed May 20, 1991 (EP-A-514,828); as well as U.S. Pat. Nos. 5,470,993, 5,374,696, 5,231,106, 5,055,438, 5,057,475, 5,096,867, 5,064,802, and 5,132,380. In U.S. Ser. No. 720, 041, filed Jun. 24, 1991, (EP-A-514,828) certain borane derivatives of the foregoing constrained geometry catalysts are disclosed and a method for their preparation taught and claimed. In U.S. Pat. No. 5,453,410 combinations of cationic constrained geometry catalysts with an alumoxane were disclosed as suitable olefin polymerization catalysts.

Exemplary constrained geometry metal complexes in which titanium is present in the +4 oxidation state include but are not limited to the following: (n-butylamido)dimethyl ($\eta^5$-tetramethylcyclopentadienyl)silanetitanium (IV) dimethyl; (n-butylamido)dimethyl($\eta^5$-tetramethylcyclopentadienyl)silanetitanium (IV) dibenzyl; (t-butylamido)dimethyl($\eta^5$-tetramethylcyclopentadienyl) silanetitanium (IV) dimethyl; (t-butylamido)dimethyl($\eta^5$-tetramethylcyclopentadienyl)silane-titanium (IV) dibenzyl; (cyclododecylamido)dimethyl($\eta^5$-tetramethylcyclopentadienyl)silanetitanium (IV) dibenzyl; (2,4,6-trimethylanilido)dimethyl-$\eta^5$-tetramethylcyclopentadienyl) silanetitanium (IV) dibenzyl; (1-adamantyl-amido)dimethyl ($\eta^5$-tetramethylcyclopentadienyl)silanetitanium (IV) dibenzyl; (t-butylamido)dimethyl($\eta^5$-tetramethylcyclopentadienyl)silanetitanium (IV) dimethyl; (t-butylamido)dimethyl($\eta^5$-tetramethylcyclopentadienyl) silanetitanium (IV) dibenzyl; (1-adamantylamido)dimethyl ($\eta^5$-tetramethylcyclopentadienyl)-silanetitanium (IV) dimethyl; (n-butylamido)diisopropoxy($\eta^5$-tetramethylcyclopentadienyl)silanetitanium (IV) dimethyl; (n-butylamido) diisopropoxy($\eta^5$-tetramethylcyclopentadienyl) silanetitanium (IV) dibenzyl; (cyclododecylamido)- diisopropoxy($\eta^5$-tetramethylcyclopentadienyl)- silanetitanium (IV) dimethyl; (cyclododecylamido) diisopropoxy($\eta^5$-tetramethylcyclopentadienyl)- silanetitanium (IV) dimethyl; (2,4,6-trimethylanilido) diisopropoxy($\eta^5$-tetramethylcyclopentadienyl)- silanetitanium (IV) dimethyl; (2,4,6-trimethylanilido) diisopropoxy($\eta^5$-tetramethyl-cyclopentadienyl) silanetitanium (IV) dibenzyl; (cyclododecylamido) dimethoxy($\eta^5$-tetramethylcyclopentadienyl)silanetitanium (IV) dimethyl; (cyclododecylamido)-dimethoxy($\eta^5$-tetramethylcyclopentadienyl)silanetitanium (IV) dibenzyl; (1-adamantylamido)diisopropoxy($\eta^5$-tetramethylcyclopentadienyl)silanetitanium (IV) dimethyl; (1-adamantylamido)diisopropoxy($\eta^5$-tetramethylcyclopentadienyl)-silanetitanium (IV) dibenzyl; (n-butylamido)dimethoxy($\eta^5$-tetramethylcyclopentadienyl)silanetitanium (IV) dimethyl; (n-butylamido) dimethoxy-$\eta^5$-tetramethylcyclopentadienyl)silanetitanium (IV) dibenzyl; (2,4,6-trimethylanilido)dimethoxy($\eta^5$-tetramethylcyclopentadienyl)silanetitanium (IV) dimethyl; (2,4,6-trimethylanilido)dimethoxy($\eta^5$-tetramethylcyclopentadienyl)silane-titanium (IV) dibenzyl; (1-adamantylamido)dimethoxy($\eta^5$-tetramethylcyclopentadienyl)silanetitanium (IV) dimethyl; (1-adamantylamido)dimethoxy($\eta^5$-tetramethylcyclopentadienyl)silanetitanium (IV) dibenzyl; (n-butylamido)-ethoxymethyl($\eta^5$-tetramethylcyclopentadienyl)silanetitanium (IV) dimethyl;

(n-butylamido)ethoxymethyl($\eta^5$-tetramethylcyclopentadienyl)silanetitanium (IV) dibenzyl; (cyclododecylamido)ethoxymethyl($\eta^5$-tetramethylcyclopentadienyl)-silanetitanium (IV) dimethyl; (cyclododecylamido)ethoxymethyl($\eta^5$-tetramethylcyclopentadienyl)silanetitanium (IV) dibenzyl; (2,4,6-trimethylanilido)ethoxymethyl-($\eta^5$-tetramethylcyclopentadienyl)silanetitanium (IV) dimethyl; (2,4,6-trimethylanilido)ethoxymethyl($\eta^5$-tetramethylcyclopentadienyl)silanetitanium (IV) dibenzyl; (cyclododecylamido)dimethyl($\eta^5$-tetramethylcyclopentadienyl)silane-titanium (IV) dimethyl; (1-adamantylamido)-ethoxymethyl($\eta^5$-tetramethylcyclopentadienyl)silanetitanium (IV) dimethyl; and (1-adamantylamidomido)ethoxymethyl($\eta^5$-tetramethylcyclo-pentadienyl)silanetitanium (IV) dibenzyl.

Exemplary constrained geometry metal complexes in which titanium is present in the +3 oxidation state include but are not limited to the following: (n-butylamido)dimethyl ($\eta^5$-tetramethylcyclopentadienyl)silanetitanium (III) 2-(N,N-dimethylamino)benzyl; (t-butylamido)dimethyl($\eta^5$-tetramethylcyclopentadienyl)silanetitanium (III) 2-(N,N-dimethylamino)benzyl; (cyclododecylamido)dimethyl($\eta^5$-tetramethylcyclopentadienyl)silanetitanium (III) 2-(N,N-dimethylamino)benzyl; (2,4,6-trimethylanilido)dimethyl ($\eta^5$-tetramethylcyclopentadienyl)silanetitanium (III) 2-(N,N-dimethylamino)benzyl; (1-adamantylamido)dimethyl($\eta^5$-tetramethylcyclopentadienyl)silanetitanium (III) 2-(N,N-dimethylamino)benzyl; (t-butylamido)dimethyl($\eta^5$-tetramethylcyclopentadienyl)silanetitanium (III) 2-(N,N-dimethylamino)benzyl; (n-butylamido)diisopropoxy($\eta^5$-tetramethylcyclopentadienyl)silanetitanium (III) 2-(N,N-dimethylamino)benzyl; (cyclododecylamido)diisopropoxy ($\eta^5$-tetramethylcyclopentadienyl)silanetitanium (III) 2-(N,N-dimethylamino)benzyl; (2,4,6-trimethylanilido) diisopropoxy($\eta^5$-2-methylindenyl)silanetitanium (III) 2-(N,N-dimethylamino)benzyl; (1-adamantylamido) diisopropoxy($\eta^5$-tetramethylcyclopentadienyl) silanetitanium (III) 2-(N,N-dimethylamino)benzyl; (n-butylamido)dimethoxy($\eta^5$-tetramethylcyclopentadienyl) silanetitanium (III) 2-(N,N-dimethylamino)benzyl; (cyclododecylamido)dimethoxy($\eta^5$-tetramethylcyclopentadienyl)silanetitanium (III) 2-(N,N-dimethylamino)benzyl; (1-adamantylamido)dimethoxy($\eta^5$-tetramethylcyclopentadienyl)silanetitanium (III) 2-(N,N-dimethylamino)benzyl; (2,4,6-trimethylanilido)dimethoxy ($\eta^5$-tetramethylcyclopentadienyl)silanetitanium (III) 2-(N,N-dimethylamino)benzyl; (n-butylamido)ethoxymethyl($\eta^5$-tetramethylcyclopentadienyl)silanetitanium (III) 2-(N,N-dimethylamino)benzyl; (cyclododecylamido)ethoxymethyl ($\eta^5$-tetramethylcyclopentadienyl)silanetitanium (III) 2-(N,N-dimethylamino)benzyl; (2,4,6-trimethylanilido) ethoxymethy($\eta^5$-tetramethylcyclopentadienyl) silanetitanium (III) 2-(N,N-dimethylamino)benzyl; and (1-adamantylamido)ethoxymethyl($\eta^5$-tetramethylcyclopentadienyl)silanetitanium (III) 2-(N,N-dimethylamino)benzyl.

Exemplary constrained geometry metal complexes in which titanium is present in the +2 oxidation state include but are not limited to the following: (n-butylamido)-dimethyl-($\eta^5$-tetramethylcyclopentadienyl)silanetitanium (II) 1,4-diphenyl-1,3-butadiene; (n-butylamido)dimethyl ($\eta^5$-tetramethylcyclopentadienyl)silanetitanium (II) 1,3-pentadiene; (t-butylamido)dimethyl($\eta^5$-tetramethylcyclopentadienyl)silane-titanium (II) 1,4-diphenyl-1,3-butadiene; (t-butylamido)dimethyl($\eta^5$-tetramethyl-cyclopentadienyl)silanetitanium (II) 1,3-pentadiene; (cyclododecylamido)dimethyl-($\eta^5$-tetramethylcyclopentadienyl)silanetitanium (II) 1,4-diphenyl-1,3-butadiene; (cyclododecylamido)dimethyl($\eta^5$-tetramethylcyclopentadienyl)silanetitanium (II) 1,3-pentadiene; (2,4,6-trimethylanilido)dimethyl($\eta^5$-tetramethylcyclopentadienyl)-silanetitanium (II) 1,4-diphenyl-1,3-butadiene; (2,4,6-trimethylanilido)dimethyl ($\eta^5$-tetramethylcyclopentadienyl)silanetitanium (II) 1,3-pentadiene; (2,4,6-trimethylanilido)dimethyl($\eta^5$-tetramethylcyclopentadienyl)silanetitanium (IV) dimethyl; (1-adamantylamido)dimethyl($\eta^5$-tetramethylcyclopentadienyl)silane-titanium (II) 1,4-diphenyl-1,3-butadiene; (1-adamantylamido)dimethyl($\eta^5$-tetramethylcyclopentadienyl)silanetitanium (II) 1,3-pentadiene; (t-butylamido)-dimethyl($\eta^5$-tetramethylcyclopentadienyl)silanetitanium (II) 1,4-diphenyl-1,3-butadiene; (t-butylamido)dimethyl($\eta^5$-tetramethylcyclopentadienyl)silanetitanium (II) 1,3-pentadiene; (n-butylamido)diisopropoxy($\eta^5$-tetramethylcyclopentadienyl)silanetitanium (II) 1,4-diphenyl-1,3-butadiene; (n-butylamido)diisopropoxy($\eta^5$-tetramethylcyclopentadienyl)silanetitanium (II) 1,3-pentadiene; (cyclododecylamido)-diisopropoxy($\eta^5$-tetramethylcyclopentadienyl)silanetitanium (II) 1,4-diphenyl-1,3-butadiene; (cyclododecylamido)diisopropoxy ($\eta^5$-tetramethylcyclopentadienyl)silanetitanium (II) 1,3-pentadiene; (2,4,6-trimethylanilido)diisopropoxy($\eta^5$-2-methylindenyl)silanetitanium (II) 1,4-diphenyl-1,3-butadiene; (2,4,6-trimethylanilido)-diisopropoxy($\eta^5$-tetramethylcyclopentadienyl)silanetitanium (II) 1,3-pentadiene; (1-adamantylamido)diisopropoxy($\eta^5$-tetramethylcyclopentadienyl)silanetitanium (II) 1,4-diphenyl-1,3-butadiene; (1-adamantylamido)diisopropoxy ($\eta^5$-tetramethyl-cyclopentadienyl)silanetitanium (II) 1,3-pentadiene; (n-butylamido)dimethoxy($\eta^5$-tetramethylcyclopentadienyl)silanetitanium (II) 1,4-diphenyl-1,3-butadiene; (n-butylamido)dimethoxy($\eta^5$-tetramethylcyclopentadienyl)silanetitanium (II) 1,3-pentadiene; (cyclododecylamido)dimethoxy($\eta^5$-tetramethylcyclopentadienyl)-silanetitanium (II) 1,4-diphenyl-1,3-butadiene; (cyclododecylamido)dimethoxy ($\eta^5$-tetramethylcyclopentadienyl)silanetitanium (II) 1,3-pentadiene; (2,4,6-trimethylanilido)dimethoxy($\eta^5$-tetramethylcyclopentadienyl)silanetitanium (II) 1,4-diphenyl-1,3-butadiene; (2,4,6-trimethylanilido)dimethoxy ($\eta^5$-tetramethylcyclopentadienyl)silanetitanium (II) 1,3-pentadiene; (1-adamantyl-amido)dimethoxy($\eta^5$-tetramethylcyclopentadienyl)silanetitanium (II) 1,4-diphenyl-1,3-butadiene; (1-adamantylamido)dimethoxy($\eta^5$-tetramethylcyclopentadienyl)-silanetitanium (II) 1,3-pentadiene; n-butylamido)ethoxymethyl($\eta^5$-tetramethylcyclopentadienyl)silanetitanium (II) 1,4-diphenyl-1,3-butadiene; (n-butylamido)ethoxymethyl($\eta^5$-tetramethylcyclopentadienyl)silanetitanium (II) 1,3-pentadiene; (cyclododecylamido)ethoxymethyl($\eta^5$-tetramethylcyclopentadienyl)silanetitanium (II) 1,4-diphenyl-1,3-butadiene; (cyclododecylamido)ethoxymethyl ($\eta^5$-tetramethylcyclopentadienyl)silanetitanium (II) 1,3-pentadiene; (2,4,6-trimethylanilido)ethoxymethyl($\eta$5-tetramethylcyclopentadienyl)silanetitanium (II) 1,4-diphenyl-1,3-butadiene; (2,4,6-trimethylanilido)ethoxyethyl ($\eta^5$-tetramethylcyclopentadienyl)silanetitanium (II) 1,3-pentadiene; (1-adamantylamido)ethoxymethyl($\eta^5$-tetramethylcyclopentadienyl)silanetitanium (II) 1,4-diphenyl-1,3-butadiene; and (1-adamantylamido) ethoxymethyl($\eta^5$-tetramethylcyclopentadienyl) silanetitanium (II) 1,3-pentadiene.

The complexes can be prepared by use of well known synthetic techniques. The reactions are conducted in a suitable noninterfering solvent at a temperature from −100 to 300° C., preferably from −78 to 100° C., most preferably from 0 to 50° C. A reducing agent may be used to cause the metal to be reduced from a higher to a lower oxidation state. Examples of suitable reducing agents are alkali metals, alkaline earth metals, aluminum and zinc, alloys of alkali metals or alkaline earth metals such as sodium/mercury amalgam and sodium/potassium alloy, sodium naphthalenide, potassium graphite, lithium alkyls, lithium or potassium alkadienyls, and Grignard reagents.

Suitable reaction media for the formation of the complexes include aliphatic and aromatic hydrocarbons, ethers, and cyclic ethers, particularly branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aromatic and hydrocarbyl-substituted aromatic compounds such as benzene, toluene, and xylene, $C_{1-4}$ dialkyl ethers, $C_{1-4}$ dialkyl ether derivatives of (poly)alkylene glycols, and tetrahydrofuran. Mixtures of the foregoing are also suitable.

Suitable activating cocatalysts and activating techniques have been previously taught with respect to different metal complexes in the following references: EP-A-277,003, U.S. Pat. Nos. 5,153,157, 5,064,802, EP-A-468,651 (equivalent to U.S. Ser. No. 07/547,718), EP-A-520,732 (equivalent to U.S. Ser. No. 07/876,268), WO 95/00683 (equivalent to U.S. Ser. No. 08/82,201), and EP-A-520,732 (equivalent to U.S. Ser. No. 07/884,966 filed May 1, 1992).

Suitable activating cocatalysts for use herein include perfluorinated tri(aryl)boron compounds, and most especially tris(pentafluorophenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium- salts of compatible, noncoordinating anions, and ferrocenium salts of compatible, noncoordinating anions. Suitable activating techniques include the use of bulk electrolysis. A combination of the foregoing activating cocatalysts and techniques may be employed as well.

Illustrative, but not limiting, examples of boron compounds which may be used as an activating cocatalysts are: tri-substituted ammonium salts such as: trimethylammonium tetrakis(pentafluorophenyl)borate; triethylammonium tetrakis(pentafluorophenyl)borate; tripropylammonium tetrakis(pentafluorophenyl)borate; tri(n-butyl)ammonium tetrakis(pentafluorophenyl)borate; tri(sec-butyl)ammonium tetrakis(pentafluoro-phenyl)borate; N,N-dimethylanilinium tetrakis(pentafluorophenyl)borate; N,N-dimethylanilinium n-butyltris(pentafluorophenyl)borate; N,N-dimethylanilinium benzyltris(pentafluorophenyl)borate; N,N-dimethylanilinium tetrakis(4-(t-butyldimethylsilyl)-2,3,5,6-tetrafluorophenyl)borate; N,N-dimethylanilinium tetrakis(4-(triisopropylsilyl)-2,3,5,6-tetrafluorophenyl)borate; N,N-dimethylanilinium pentafluorophenoxytris (pentafluorophenyl)borate; N,N-diethylanilinium tetrakis (pentafluorophenyl)borate; N,N-dimethyl-2,4,6-trimethylanilinium tetrakis(pentafluorophenyl)borate; trimethylammonium tetrakis(2,3,4,6-tetrafluorophenyl)borate; triethylammonium tetrakis(2,3,4,6-tetrafluorophenyl)borate; tripropylammonium tetrakis(2,3,4,6-tetrafluorophenyl)borate; tri(n-butyl)ammonium tetrakis (2,3,4,6-tetrafluorophenyl)borate; dimethyl(t-butyl) ammonium tetrakis(2,3,4,6-tetrafluorophenyl)borate; N,N-dimethylanilinium tetrakis(2,3,4,6-tetrafluorophenyl)borate; N,N-diethylanilinium tetrakis(2,3,4,6-tetrafluorophenyl) borate; and N,N-dimethyl-2,4,6-trimethylanilinium tetrakis (2,3,4,6-tetrafluorophenyl)borate;

disubstituted ammonium salts such as: di-(i-propyl) ammonium tetrakis(pentafluoro-phenyl)borate; and dicyclohexylammonium tetrakis(pentafluorophenyl) borate;

trisubstituted phosphonium salts such as: triphenylphosphonium tetrakis(pentafluoro-phenyl)borate; tri(o-tolyl)phosphonium tetrakis(pentafluorophenyl)borate; and tri(2,6-dimethylphenyl)phosphonium tetrakis (pentafluorophenyl)borate;

disubstituted oxonium salts such as: diphenyloxonium tetrakis(pentafluoro-phenyl)borate; di(o-tolyl)oxonium tetrakis(pentafluorophenyl)borate; and di(2,6-dimethylphenyl)oxonium tetrakis(pentafluorophenyl) borate; and disubstituted sulfonium salts such as: diphenylsulfonium tetrakis(pentafluorophenyl)borate; di(o-tolyl) sulfonium tetrakis(pentafluorophenyl)borate; and bis (2,6-dimethylphenyl)sulfonium tetrakis (pentafluorophenyl)borate.

Other cocatalysts include, but are not limited to boron compounds which may be used as ionic activating cocatalysts, which are tri-substituted ammonium salts such as: decyldi(methyl)ammonium tetrakis(pentafluorophenyl) borate, dodecyldi(methyl)ammonium tetrakis (pentafluorophenyl)borate, tetradecyldi(methyl)ammonium tetrakis(pentafluorophenyl)borate, hexaadecyldi(methyl) ammonium tetrakis(pentafluorophenyl)borate, octadecyldi (methyl)ammonium tetrakis(pentafluorophenyl)borate, eicosyldi(methyl)ammonium tetrakis(pentafluorophenyl) borate, methyldi(decyl)ammonium tetrakis (pentafluorophenyl)borate, methyldi(dodecyl)ammonium tetrakis(pentafluorophenyl)borate, methyldi(tetradecyl) ammonium tetrakis(pentafluorophenyl)borate, methyldi (hexadecyl)ammonium tetrakis(pentafluorophenyl)borate, methyldi(octadecyl)ammonium tetrakis(pentafluorophenyl) borate, methyldi(eicosyl)ammonium tetrakis (pentafluorophenyl)borate, tridecylammonium tetrakis (pentafluorophenyl)borate, tridodecylammonium tetrakis (pentafluorophenyl)borate, tritetradecylammonium tetrakis (pentafluorophenyl)borate, trihexadecylammonium tetrakis (pentafluorophenyl)borate, trioctadecylammonium tetrakis (pentafluorophenyl)borate, trieicosylammonium tetrakis (pentafluorophenyl)borate, decyldi(n-butyl)ammonium tetrakis(pentafluorophenyl)borate, dodecyldi(n-butyl) ammonium tetrakis(pentafluorophenyl)borate, octadecyldi (n-butyl)ammonium tetrakis(pentafluorophenyl)borate, N,N-didodecylanilinium tetrakis(pentafluorophenyl)borate, N-methyl-N-dodecylanilinium tetrakis(pentafluorophenyl) borate, N,N-di(octadecyl)(2,4,6-trimethylanilinium) tetrakis (pentafluorophenyl)borate, cyclohexyldi(dodecyl) ammonium tetrakis(pentafluorophenyl)borate, and methyldi (dodecyl) ammonium tetrakis-(2,3,4,6-tetrafluorophenyl) borate.

Suitable similarly substituted sulfonium or phosphonium salts such as, di(decyl)sulfonium tetrakis (pentafluorophenyl)borate, (n-butyl)dodecylsulfonium tetrakis(pentafluorophenyl)borate, tridecylphosphonium tetrakis(pentafluorophenyl)borate, di(octadecyl) methylphosphonium tetrakis(pentafluorophenyl)borate, and tri(tetradecyl)phosphonium tetrakis(pentafluorophenyl) borate, may also be named.

Most preferred activating cocatalysts are trispentafluorophenylborane and di(octadecyl)methylammonium tetrakis (pentafluorophenyl)borate, di(octadecyl)(n-butyl) ammonium tetrakis(pentafluorophenyl)borate, and (bis (hydrogenated-tallowalkyl)methylammonium)tetrakis (pentafluorophenyl)borate.

Alumoxanes, especially methylalumoxane or triisobutylaluminum modified methylalumoxane are also suitable activators and may be used for activating the metal complexes.

The molar ratio of metal complex: activating cocatalyst employed preferably ranges from 1:1000 to 2:1, more preferably from 1:5 to 1.5:1, most preferably from 1:2 to 1:1. In the preferred case in which a metal complex is activated by trispentafluorophenylborane and triisobutylaluminum modified methylalumoxane, the titanium:boron:aluminum molar ratio is typically from 1:10:50 to 1:0.5:0.1, most typically from about 1:3:5.

A support, especially silica, alumina, or a polymer (especially poly(tetrafluoroethylene) or a polyolefin) may be employed, and desirably is employed when the catalysts are used in a gas phase polymerization process. The support is preferably employed in an amount to provide a weight ratio of catalyst (based on metal):support from 1:100,000 to 1:10, more preferably from 1:50,000 to 1:20, and most preferably from 1:10,000 to 1:30. In most polymerization reactions the molar ratio of catalyst:polymerizable compounds employed is from $10^{-12}$:1 to $10^{-1}$:1, more preferably from $10^{-9}$:1 to $10^{-5}$:1.

At all times, the individual ingredients as well as the recovered catalyst components must be protected from oxygen and moisture. Therefore, the catalyst components and catalysts must be prepared and recovered in an oxygen and moisture free atmosphere. Preferably, therefore, the reactions are performed in the presence of a dry, inert gas such as, for example, nitrogen.

The polymerization may be carried out as a batchwise or a continuous polymerization process, with continuous polymerizations processes being required for the preparation of substantially linear polymers. In a continuous process, ethylene, comonomer, and optionally solvent and diene are continuously supplied to the reaction zone and polymer product continuously removed therefrom.

In general, the homogeneous linear or substantially linear polymer may be polymerized at conditions for Ziegler-Natta or Kaminsky-Sinn type polymerization reactions, that is, reactor pressures ranging from atmospheric to 3500 atmospheres (350 MPa). The reactor temperature should be greater than 80° C., typically from 100° C. to 250° C., and preferably from 100° C. to 150° C., with temperatures at the higher end of the range, i.e., temperatures greater than 100° C. favoring the formation of lower molecular weight polymers.

In conjunction with the reactor temperature, the hydrogen:ethylene molar ratio influences the molecular weight of the polymer, with greater hydrogen levels leading to lower molecular weight polymers. When the desired polymer has an $I_2$ of 1 g/10 min, the hydrogen:ethylene molar ratio will typically be 0:1. When the desired polymer has an $I_2$ of 1000 g/10 min., the hydrogen:ethylene molar ratio will typically be from 0.45:1 to 0.7:1. The upper limit of the hydrogen-:ethylene molar ratio is typically from 2.2–2.5:1.

Generally the polymerization process is carried out with a differential pressure of ethylene of from about 10 to about 1000 psi (70 to 7000 kPa), most preferably from about 40 to about 60 psi (30 to 300 kPa). The polymerization is generally conducted at a temperature of from 80 to 250° C., preferably from 90 to 170° C., and most preferably from greater than 95 to 140° C.

In most polymerization reactions the molar ratio of catalyst:polymerizable compounds employed is from $10^{-12}$:1 to $10^{-1}$:1, more preferably from $10^{-9}$:1 to $10^{-5}$:1.

Solution polymerization conditions utilize a solvent for the respective components of the reaction. Preferred solvents include mineral oils and the various hydrocarbons which are liquid at reaction temperatures. Illustrative examples of useful solvents include alkanes such as pentane, iso-pentane, hexane, heptane, octane and nonane, as well as mixtures of alkanes including kerosene and Isopar-E™, available from Exxon Chemicals Inc.; cycloalkanes such as cyclopentane and cyclohexane; and aromatics such as benzene, toluene, xylenes, ethylbenzene and diethylbenzene.

The solvent will be present in an amount sufficient to prevent phase separation in the reactor. As the solvent functions to absorb heat, less solvent leads to a less adiabatic reactor. The solvent:ethylene ratio (weight basis) will typically be from 2.5:1 to 12:1, beyond which point catalyst efficiency suffers. The most typical solvent:ethylene ratio (weight basis) is in the range of from 5:1 to 10:1.

The at least one first polymer may further be made in a slurry polymerization process, using the catalysts as described above as supported in an inert support, such as silica. As a practical limitation, slurry polymerizations take place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or part as the diluent. Most preferably the diluent comprises in at least major part the α-olefin monomer or monomers to be polymerized.

In preparing hot melt adhesives for use in low temperature applications, the homogeneous linear or substantially linear interpolymers will preferably be present in amounts from 20 percent to 65 percent by weight in the adhesive, preferably from 25 percent to 45 percent by weight and more preferably from 30 percent by weight to 40 percent by weight.

Additionally, or in the alternative, the homogeneous linear or substantially linear interpolymer may be combined with other homopolymers, copolymers and terpolymers of ethylene including low density polyethylene as well as grafted and malleated versions, ethylene vinyl acetate copolymers, ethylene n-butyl acrylate copolymers, ethylene methylacrylate copolymers; homopolymers, copolymers and terpolymers of propylene; and rubbery block copolymers including those having the general configuration A—B—A triblocks, A—B—A—B—A—B multiblocks, A—B diblocks and radial block copolymers. These additional polymers may be used in amounts up to about 20 percent by weight in the adhesive, and preferably up to about 10 percent by weight in the adhesive.

The waxes useful herein may include paraffin waxes, microcrystalline waxes, high density low molecular weight polyethylene waxes, by-product polyethylene waxes, Fischer-Tropsch waxes, oxidized Fischer-Tropsch waxes and functionalized waxes such as hydroxy stearamide waxes and fatty amide waxes. It is common in the art to use the terminology synthetic high melting point waxes to include high density low molecular weight polyethylene waxes, by-product polyethylene waxes and Fischer-Tropsch waxes.

Exemplary high density low molecular weight polyethylene waxes falling within this category include ethylene homopolymers available from Petrolite, Inc. (Tulsa, Okla.) as Polywax™ 500, Polywax™ 1500 and Polywax™ 2000. Polywax™ 2000 has a molecular weight of approximately 2000, an $M_w/M_n$ of approximately 1.0, a density at 16° C. of about 0.97 g/cm³, and a melting point of approximately 126° C.

The paraffin waxes useful herein are those having a ring and ball softening point of about 55° C. to about 85° C. Preferred paraffin waxes are Okerin® 236 TP available from Astor Wax Corporation located in Doraville, Ga.; Penreco® 4913 available from Pennzoil Products Co. in Houston, Tex.; R-7152 Paraffin Wax available from Moore & Munger in Shelton, Conn.; and Paraffin Wax 1297 available from International Waxes, Ltd in Ontario, Canada.

Other paraffinic waxes include waxes available from CP Hall under the product designations 1230, 1236, 1240, 1245, 1246, 1255, 1260, & 1262. CP Hall 1246 paraffinic wax is available from CP Hall (Stow, Ohio). CP Hall 1246 paraffinic wax has a melting point of 143° F. (62° C.), a viscosity at 210° F. (99° C.) of 4.2 centipoise (0.042 grams/(cm.second), and a specific gravity at 73° F. (23° C.) of 0.915 g/cm$^3$.

The microcrystalline waxes useful here are those having 50 percent by weight or more cyclo or branched alkanes with a length of between 30 and 100 carbons. They are generally less crystalline than paraffin and polyethylene waxes, and have melting points of greater than about 70° C. Examples include Victory® Amber Wax, a 70° C. melting point wax available from Petrolite Corp. located in Tulsa, Okla.; Bareco® ES-796 Amber Wax, a 70° C. melt point wax available from Bareco in Chicago, Ill.; Okerin® 177, an 80° C. melt point wax available from Astor Wax Corp.; Besquare® 175 and 195 Amber Waxes and 80° C. and 90° C. melt point microcrystalline waxes both available from Petrolite Corp. in Tulsa, Okla.; Indramic® 91, a 90° C. melt point wax available from Industrial Raw Materials located in Smethport, Pa.; and Petrowax® 9508 Light, a 90° C. melt point wax available from Petrowax PA, Inc. located in New York, N.Y.

The synthetic high melting point (HMP) waxes useful herein are high density, low molecular weight polyethylene waxes, by-product polyethylene waxes and Fischer-Tropsch waxes. Preferred waxes include Petroilte® C-4040, Polywax® 1000, 2000 and 3000, low molecular weight polyethylene waxes available from Petrolite Corp.; Escomer® H-101, a modified polyethylene wax available from Exxon Chemical Co.; Marcus® 100, 200 and 300, low molecular weight by-product polyethylene waxes available from Marcu Chemical Co., a Division of H.R.D. Corp. located in Houston, Tex.; Paraflinte H-1, H-4 and H-8, Fischer-Tropsch waxes available from Sasol-SA/Moore & Munger in Shelton, Conn.; and Petrolite® PX-100, a Fischer-Tropsch wax available from Bareco.

Preferred waxes, particularly when it is desired to prepare the hot melt adhesives of the invention in a dual reactor scheme, will be homogeneous waxes prepared using a constrained geometry or single site catalyst and using the procedures such as are set forth above and in the Examples below. Such polymers will be either ethylene homopolymers or interpolymers of ethylene and a comonomer which is a $C_3$–$C_{20}$ α-olefin, styrene, alkyl-substituted styrene, tetrafluoroethylene, vinylbenzocyclobutane, non-conjugated diene, or naphthenic, preferably a $C_4$–$C_{20}$ α-olefin or styrene, and more preferably, a $C_6$–$C_{20}$ α-olefin.

The homogeneous wax will have a melt viscosity at 350° F. such as to yield the desired overall viscosity and close time of the hot melt adhesive formulation. Typically, the homogeneous wax will have a melt viscosity at 350° F. (177° C.) of no more than 1000 centipoise (10 grams/(cm.second)), preferably no more than 800 centipoise (8 grams/(cm.second)), with homogeneous waxes having a melt viscosity at 350° F. (177° C.) of no more than 500 centipoise (5 grams/(cm.second)) being useful. The homogeneous wax will typically have a melt viscosity at 350° F. (177° C.) of at least 100 centipoise (1 grams/(cm.second)), typically at least 120 centipoise (1.2 grams/(cm.second)), more typically at least 150 centipoise (1.5 grams/cm.second), with waxes having a melt viscosity at 350° F. (177° C.) of at least 200 centipoise (2 grams/(cm.second)) being particularly preferred from the standpoint of process economics.

Such polymers, in contrast to traditional waxes, will preferably have a $M_w/M_n$ of from 1.5 to 2.5, preferably from 1.8 to 2.2.

The homogeneous wax will have a density of at least 0.885 g/cm$^3$, preferably at least 0.900 g/cm$^3$, more preferably at least 0.920 g/cm$^3$. The homogeneous wax will have a density of no more than 0.970 g/cm$^3$, preferably no more than 0.965 g/cm$^3$, more preferably no more than 0.940 g/cm$^3$.

Particularly in the case of hot melt adhesives formulated to be applied at temperatures of less than 150° C., the waxes are useful in amounts from 0 percent to 40 percent by weight in the adhesive, preferably from 15 percent to 35 percent by weight in the adhesive and most preferably from 20 percent to 30 percent by weight in the adhesive, and may be used in any combination. However, waxes are useful to modify the rate of set, lower the viscosity, increase the heat resistance and improve machinability of the finished adhesive. Thus, the amount and type of wax used will be determined based on those factors.

As used herein, the term "tackifier" means any of several hydrocarbon based compositions useful to impart tack to the hot melt adhesive composition. For instance, several classes of tackifiers include aliphatic $C_5$ resins, polyterpene resins, hydrogenated resins, mixed aliphatic-aromatic resins, rosin esters, and hydrogenated rosin esters.

Exemplary tackifying resins useful herein include aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures thereof. These tackifying resins have a ring and ball softening point from 70° C. to 150° C., and will typically have a viscosity at 350° F. (177° C.), as measured using a Brookfield viscometer, of no more than 2000 centipoise (20 grams/cm.second). They are also available with differing levels of hydrogenation, or saturation, which is another commonly used term. Useful examples include Eastotac® H-100, H-115 and H-130 from Eastman Chemical Co. in Kingsport, Tenn., which are partially hydrogenated cycloaliphatic petroleum hydrocarbon resins with softening points of 100° C., 115° C. and 130° C., respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3 and the W grade has a bromine number of 1. Eastotac® H-142R from Eastman Chemical Co. has a softening point of about 140° C. Other useful tackifying resins include Escorez® 5300 and 5400, partially hydrogenated cycloaliphatic petroleum hydrocarbon resins, and Escorez® 5600, a partially hydrogenated aromatic modified petroleum hydrocarbon resin all available from Exxon Chemical Co. in Houston, Tex.; Wingtack® Extra which is an aliphatic, aromatic petroleum hydrocarbon resin available from Goodyear Chemical Co. in Akron, Ohio; Hercolite® 2100, a partially hydrogenated cycloaliphatic petroleum hydrocarbon resin available from Hercules, Inc. in Wilmington, Del.; and Zonatac® 105 and 501 Lite, which are styrenated terpene resins made from d-limonene and available from Arizona Chemical Co. in Panama City, Fla.

There are numerous types of rosins and modified rosins available with differing levels of hydrogenation including gum rosins, wood rosins, tall-oil rosins, distilled rosins, dimerized rosins and polymerized rosins. Some specific modified rosins include glycerol and pentaerythritol esters of wood rosins and tall-oil rosins. Commercially available grades include, but are not limited to, Sylvatac® 1103, a pentaerythritol rosin ester available from Arizona Chemical Co., Unitac® R-100 Lite, a pentaerythritol rosin ester from Union Camp in Wayne, N.J., Permalyn® 305, a erythritol modified wood rosin available from Hercules and Foral 105 which is a highly hydrogenated pentaerythritol rosin ester also available from Hercules. Sylvatac® R-85 and 295 are 85° C. and 95° C. melt point rosin acids available from Arizona Chemical Co. and Foral AX is a 70° C. melt point hydrogenated rosin acid available from Hercules, Inc. Nirez V-2040 is a phenolic modified terpene resin available from Arizona Chemical Co.

Another exemplary tackifier, Piccotac 115, has a viscosity at 350° F. (177° C.) of about 1600 centipoise (16 grams/(cm.second)). Other typical tackifiers have viscosities at 350° F. (177° C.) of much less than 1600 centipoise (16 grams/(cm.second)), for instance, from 50 to 300 centipoise (0.5 to 3 grams/(cm.second)).

Exemplary aliphatic resins include those available under the trade designations Escorez™, Piccotac™, Mercures™, Wingtack™, Hi-Rez™, Quintone™, Tackirol™, etc. Exemplary polyterpene resins include those available under the trade designations Nirez™, Piccolyte™, Wingtack™, Zonarez™, etc. Exemplary hydrogenated resins include those available under the trade designations Escorez™, Arkon™, Clearon™, etc. Exemplary mixed aliphatic-aromatic resins include those available under the trade designations Escorez™, Regalite™, Hercures™, AR™, Imprez™, Norsolene™ M, Marukarez™, Arkon™ M, Quintone™, etc. Other tackifiers may be employed, provided they are compatible with the homogeneous linear or substantially linear ethylene/α-olefin interpolymer and the wax.

In certain embodiments, the hot melt adhesive will be prepared without the use of a tackifier or with a minimal quantity of tackifier. As tackifiers are malodorous, tend to cause corrosion of mechanical equipment, and cannot be easily separated from recycled paper pulp, hot melt adhesives which minimize the use of tackifiers are advantageous. Moreover, as tackifiers generally undergo degradation at elevated temperatures, hot melt adhesives which minimize the use of tackifiers will exhibit improved thermal stability. Hot melt adhesives having less than 20 weight percent tackifier, preferably less than 15 weight percent tackifier and more preferably less than 10 weight percent tackifier, will be preferred when it is desired to prepare the hot melt adhesive in a dual reactor configuration.

However, particularly for the hot melt adhesives of the invention which are suitable for use at low application temperatures, the adhesive of the present invention will comprises tackifying resins present in an amount from 10 percent to 60 percent by weight in the adhesive, preferably from 20 to 55 percent by weight in the adhesive, more preferably from 25 percent to 50 percent by weight in the adhesive, and most preferably from 30 percent to 45 percent by weight in the adhesive.

Additives such as antioxidants (e.g., hindered phenolics (e.g., Irganox™ 1010, Irganox™ 1076), phosphites (e.g., Irgafos™ 168)), antiblock additives, pigments dyes, fluorescing agents, and fillers, can also be included in the modified formulations, to the extent that they do not interfere with the enhanced formulation properties discovered by Applicant.

Stabilizer and antioxidants are added to protect the adhesive from degradation caused by reactions with oxygen which are induced by such things as heat, light or residual catalyst from the raw materials. Lowering the temperature of application as in the present invention also helps to reduce degradation. Such antioxidants are commercially available from Ciba-Geigy located in Hawthorn, N.Y. and include Irganox® 565, 1010 and 1076 which are hindered phenolic antioxidants. These are primary antioxidants which act as free radical scavengers and may be used alone or in combination with other antioxidants such as phosphite antioxidants like Irgafos® 168 available from Ciba-Geigy. Phosphite antioxidants are considered secondary antioxidants, are not generally used alone, and are primarily used as peroxide decomposers. Other available antioxidants are Cyanox® LTDP available from Cytec Industries in Stamford, Conn. and Ethanox® 1330 available from Albemarle Corp. in Baton Rouge, La. Many other antioxidants are available for use by themselves, or in combination with other such antioxidants. When employed, the antioxidant is typically present in an amount less than 0.5 weight percent, preferably less than 0.2 weight percent, based on the total weight of the hot melt adhesive.

The hot melt adhesive may further comprise an oil. Oils are typically employed to reduce the viscosity of the hot melt adhesive. When employed, oils will be present in an amount less than 15, preferably less than 10, and more preferably less than 5 weight percent, based on the weight of the hot melt adhesive. Exemplary classes of oils include white mineral oil (such as Kaydol™ oil (available from Witco), and Shellflex™ 371 naphthenic oil (available from Shell Oil Company). To the extent that the oil decreases the adhesion character of the hot melt adhesive to levels detrimental for the contemplated use, it should not be employed.

The hot melt adhesives of the invention may be prepared by standard melt blending procedures. In particular, the homogeneous linear or substantially linear ethylene polymer, wax, and optional tackifier(s) may be melt blended at an elevated temperature (from 150 to 200° C.) under an inert gas blanket until a homogeneous mix is obtained. Any mixing method producing a homogeneous blend without degrading the hot melt components is satisfactory, such as through the use of a heated vessel equipped with a stirrer.

Further, the first polymer(s), wax(s), and the optional tackifier(s) may be provided to an extrusion coater for application to the substrate.

In the alternative, when the wax is a homogeneous wax, as described herein, it will be preferable to prepare the hot melt adhesives using a dual reactor configuration, with one of the homogeneous linear or substantially linear ethylene polymer or wax being produced in the first reactor, the other of the homogeneous linear or substantially linear ethylene polymer or wax being produced in a second reactor, and a tackifier optionally provided, typically at a point after the second reactor, via a side-arm extruder. It is noted that the reactors may be operated in series or in parallel. In conjunction with the process of the invention, hot melt adhesives can be provided in forms such as pellets, pillows, or any other desired configuration. Examples of such a process which may be adapted in accordance with the teachings of this disclosure to prepare blends of a homogenous linear (higher molecular weight or ultra-low molecular weight) or substantially linear ethylene/α-olefin interpolymer, wax, and optional tackifier, are disclosed in WO 94/00500 and WO 94/01052.

The resultant adhesives will typically be characterized by Brookfield™ viscosities of less than 5,000 cps (50 grams/(cm.second)) at 150° C., preferably less than 3,500 cps (35 grams/(cm.second)) at 150° C. and most preferably less than 2,000 cps (20 grams/(cm.second)) at 150° C. making them ideally suited for application temperatures of less than 150° C., and preferably from about 135° C. to 150° C. on extrusion type packaging equipment, such as those manufactured by Nordson Corp. of Atlanta, Ga. Mercer Corp., Slautterback Corp. and ITW also manufacture extrusion type packaging equipment.

The adhesive formulations of the present invention are further characterized by low densities. The low density interpolymer allows for better adhesion due to better penetration into the substrates. Low densities also make them ideally suited for recycling. The low density allows for better separation in the repulping process. The density of the homogeneous linear or substantially linear interpolymer of ethylene of the present invention is less than 0.895 g/cm³, preferably less than 0.885 g/cm³, and more preferably less than 0.875 g/cm³; and is at least 0.850 g/cm³, preferably at least 0.855g/cm³. In contrast ethylene vinyl acetate copolymers, the standard base polymer in the packaging industry, have densities greater than 0.900 g/cm³. Additionally, the most commonly used ethylene vinyl acetate copolymers have densities greater than 0.940 g/10 minutes with those with vinyl acetate contents of 28 percent having densities of greater than 0.950 g/10 minutes. Ethylene n-butyl acrylates and ethylene methyl acrylates also have densities greater than 0.900 g/cm³.

The hot melt adhesives of the present invention are further characterized by excellent heat resistance and excellent flexibility. The 100 gram peel values are an illustration of the heat resistance of the adhesive composition. The peel values (PAFT) are greater than 40° C., more preferably greater than 50° C. and most preferably greater than 60° C. high heat resistance in combination with good cold temperature properties is a significant improvement in the state of the art for low temperature packaging adhesives.

These hot melt adhesives are ideally suited for use in the packaging industry for case and carton sealing and for tray forming. These packages may be manufactured from materials such as virgin and recycled kraft, high and low density kraft, chipboard and various types of treated and coated kraft and chipboard, and corrugated versions of these materials. These adhesives may also bond composite materials such as those types of packages used for packaging of alcoholic beverages. These composite materials may include chipboard laminated with an aluminum foil which is further laminated to film materials such as polyethylene, mylar, polypropylene, polyvinylidene chloride, ethylene vinyl acetate and various other types of films. Such film materials may also be bonded directly to chipboard or kraft in the absence of aluminum foil. One of ordinary skill in the art would recognize that a variety of substrates are used in the packaging industry to which the hot melt adhesives of the present invention may adhere.

EXAMPLES

The hot melt adhesive examples of the invention were prepared in the following manner. The adhesive ingredients, other than the polymers, were melted in a forced air type oven between 150° C. and 175° C. The polymer was then slowly added to the melt in what is known in the art as an upright or lightening mixer such as the Stirrer Type RZRI manufactured by Caframo in Wiarton, Ontario, Canada. The blend was kept at temperatures of between 150° C. and 175° C. using a heating mantle such as those manufactured by Glas-Col in Terre Haute, Ind. The formulas were then mixed until smooth and homogeneous. The antioxidant may be added either during the melting stage, the mixing stage or during both.

Unless otherwise indicated, the homogeneous ethylene polymers utilized in the HMA's of the invention were ethylene/1-octene interpolymers prepared in accordance with the procedures of U.S. Pat. Nos. 5,272,236 and 5,278,272. In the case of the ethylene/octene polymers having a density of 0.858 g/cm³ and an $I_2$ of 500 g/10 min. (melt viscosity at 350° F. (177° C.) of 22,700 cps (227 grams/(cm.second))), the additive package employed was 100 ppm water as a catalyst kill and 2000 ppm Irganox™ 1010 hindered phenolic antioxidant (available from Ciba Geigy). In the case of the ethyleneloctene polymers having a density of 0.873 g/cm³ and an $I_2$ of 500 g/10 min (melt viscosity at 350° F. of 18,750 cps (188 grams/(cm.second))), a density of 0.862 g/cm³ and an $I_2$ of 1000 g/10 min. (melt viscosity at 350° F. (177° C.) of 10,740 cps (107 grams/(cm.second))), and a density of 0.870 g/cm³ and an $I_2$ of 1000 g/10 min. (melt viscosity at 350° F. (177° C.) of 9000 cps (90 grams/(cm.second))), the additive package employed was 35 ppm water as a catalyst kill and 2000 ppm Irganox™ hindered phenolic antioxidant.

Examples 1 and 2

TABLE I

|  | 1 | 2 |
|---|---|---|
| 0.870/1000 MI Ethylene/Octene Copolymer | 33 | 25 |
| Eastotac H-130 Tackifying Resin | 34.7 | 51.7 |
| PX-100 Fischer-Tropsch Wax | 32 | 23 |
| Irganox 1010 Antioxidant | 0.3 | 0.3 |

TABLE II

Physical Properties and Bonding Data

|  | 1 | 2 | A | B | C | D |
|---|---|---|---|---|---|---|
| Viscosity at 135° C. cps (g/(cm·sec)) | 1090 (10.9) 770 | 1110 (11.1) 765 | 1000 (10.0) 650 | 1105 (11.05) 780 | 910 (9.1) 680 | — 2400 |
| at 149° C. | (7.7) | (7.65) | (6.5) | (7.8) | (6.8) | (24.0) |
| Specific Gravity (g/cm³) | 0.93 | 0.95 | 0.97 | 0.97 | 0.96 | 0.99 |
| 100 gram Peel (° C.) | 64 | 69 | 54 | 58 | 42 | 63 |
| 500 gram Shear (° C.) | 92 | 86 | 71 | 69 | 64 | 92 |
| Bonding Performance |  |  |  |  |  |  |
| percent 48 hrs at −40° C. | 5 | 0 | 5 | 0 | 0 | 0 0 |
| 48 hrs at −18° C. | 5 | 0 | 0 | 0 | 0 | 0 |
| 48 hrs at 4° C. | 45 | 0 | 0 | 10 | 35 | 50 |
| 48 hrs at 25° C. | 80 | 0 | 30 | 25 | 65 | 85 |

TABLE II-continued

Physical Properties and Bonding Data

|  | 1 | 2 | A | B | C | D |
|---|---|---|---|---|---|---|
| 48 hrs at 49° C. Heat Stability: | 100 | 0 | 70 | 90 | 20 | |
| 96 hrs at 135° C. Δ percent Viscosity at 135° C. | −2 | 3 | 15 | 8 | 5 | 12 |
| Δ Gardner Color | 1 | 1 | 7 | 8 | 8 | 6 |

Comparative Examples A, B and C are commercially available adhesives based on ethylene vinyl acetate which are designed for low application temperatures. The ingredients employed in Examples 1 and 2 are depicted in Table I. Examples 1 and 2 exhibit significantly higher heat resistance as evidenced by the 100 gram peel data (PAFT) and lower specific gravities than commercially available adhesives. Example 1 shows superior bonding performance at all temperatures and is designed as an all purpose adhesive. The adhesives were applied to high performance corrugated boardstock at an application temperature of 135° C., except for Comparative Example D which was applied at an application temperature of 177° C. The figures here represent the percent fiber tear as an amount of the total bond made. For example, if the bond is 6 inches (15 cm) long, and 3 of those inches (7.5 cm) show fiber tear then it is a 50 percent fiber tearing bond. Both Examples 1 and 2 exhibit superior heat stability shown by the change in viscosity and Gardner color over a 96 hour period.

Comparative Example D

Comparative Example D is commercially available from the H.B. Fuller Co. located in St. Paul, Minn. It is hot melt packaging adhesive which is a standard of the industry and is based on ethylene vinyl acetate and designed for application temperatures of 177° C.

The bonds were made at an application temperature of 177° C. as opposed to 135° C. for all of the other examples in Table II. Heat stability tests were also conducted at 177° C. compared to 135° C. for the other examples.

This comparative example illustrates the surprisingly high heat resistance obtained with the adhesives of the present invention. The adhesives of the present invention surprisingly have heat resistance that is as high or higher, as illustrated by the 100 gram peel values (PAFT), as commercially available packaging adhesives designed for application temperatures of 177° C., while having much lower viscosities.

Examples 3 to 20

TABLE III

| Sample | 0.862/ 1000 | 0.870/ 1000 | 0.858/ 500 | 0.873/ 500 | Eastotac H-130R | Eastotac H-100R | Bareco PX-100 wax | 195 Micro | Antioxidant |
|---|---|---|---|---|---|---|---|---|---|
| 3 | — | 30 | — | — | 28.2 | 16.5 | 25 | — | 0.3 |
| 4 | — | 30 | — | 3 | 37 | — | 29.7 | — | 0.3 |
| 5 | — | 33 | — | — | 34.7 | — | 32 | — | 0.3 |
| 6 | — | 25 | — | — | 51 | — | 6.9 | 16.7 | 0.3 |
| 7 | — | 30 | — | 3 | 36.1 | — | 22.2 | 8.2 | 0.3 |
| 8 | — | 25 | — | — | 51.7 | — | 23 | — | 0.3 |
| 9 | 25 | — | — | — | — | 55 | 20 | — | 0.3 |
| 10 | 35 | — | — | — | 25 | — | — | 40 | 0.3 |
| 11 | 10 | — | 15 | — | 55 | — | 20 | — | 0.3 |
| 12 | 35 | — | — | — | — | 25 | 40 | — | 0.3 |
| 13 | 25 | — | 15 | — | — | 40 | 20 | — | 0.3 |
| 14 | 10 | — | 15 | — | — | 35 | — | 40 | 0.3 |
| 15 | 30 | — | — | — | 28.2 | 16.5 | 25 | — | 0.3 |
| 16 | 30 | — | 3 | — | 37 | — | 29.7 | — | 0.3 |
| 17 | 33 | — | — | — | 34.7 | — | 32 | — | 0.3 |
| 18 | 25 | — | — | — | 51 | — | 6.9 | 16.7 | 0.3 |
| 19 | 30 | — | 3 | — | 36.1 | — | 22.2 | 8.2 | 0.3 |
| 20 | 25 | — | — | — | 51.7 | — | 23 | — | 0.3 |

Table III shows various formulas comprising several different grades of the homogeneous linear or substantially linear interpolymer of ethylene with at least one $C_3$ to $C_{20}$ α-olefin. Each of the columns show the amount used in percent by weight in the adhesive of the various adhesive components. Column 2 depicts a homogeneous interpolymer having a density of 0.862 g/cm$^3$ and a melt index of 1000 g/10 min., Column 3 depicts a homogeneous interpolymer having a density of 0.870 g/cm$^3$ and a melt index of 1000 g/10 min., Column 4 depicts a homogeneous interpolymer having a density of 0.86 g/cm$^3$ and a melt index of 500 g/10 min. and Column 5 depicts a homogeneous interpolymer having a density of 0.87 g/cm$^3$ and a melt index of 500 g/10 min., each of which has been previously described. Eastotac® H-130R and H-100R are hydrocarbon resins having melt points of 130° C. and 100° C. respectively. Bareco® PX-100 is a synthetic high melting point Fischer-Tropsch wax, 195 micro is a microcrystalline wax having a melt point of 90° C. and the antioxidant. is Irganox 1010 hindered phenolic antioxidant sold by Ciba-Geigy.

TABLE IV

| Sample | Viscosity at 135° C. (275° F.) cps (grams/ (cm · second) | Viscosity at 149° C. (300° F.) cps (grams/ (cm · second) | 100 g Peel (PAFT) (° C.) | 500 g Shear (SAFT) (° C.) | 40° C. Bond (-40° F.) percent | -18° C. Bond (0° F.) percent | 4° C. Bond (40° F.) percent | Room Temperature Bond percent | 49° C. Bond (120° F.) percent |
|---|---|---|---|---|---|---|---|---|---|
| 3  | 1197 (11.97) | 821 (8.21)   | 64 | 89 | 0  | 0  | 0   | 40  | 90  |
| 4  | 1368 (13.68) | 878 (8.78)   | 62 | 92 | 0  | 0  | 25  | 80  | 10  |
| 5  | 1090 (10.90) | 770 (7.70)   | 61 | 93 | 0  | 5  | 45  | 80  | 100 |
| 6  | 1098 (10.98) | 752 (7.52)   | 66 | 82 | 0  | 0  | 0   | 0   | 30  |
| 7  | 1197 (11.97) | 858 (8.58)   | 61 | 89 | 0  | 0  | 30  | 60  | 90  |
| 8  | 1111 (11.11) | 764 (7.64)   | 69 | 86 | 0  | 0  | 0   | 0   | 5   |
| 9  | 1256 (12.56) | 831 (8.31)   | 56 | 83 | 5  | 0  | 30  | 85  | 100 |
| 10 | 1172 (11.72) | 841 (8.41)   | 48 | 81 | 44 | 42 | 100 | 100 | 90  |
| 11 | 1950 (19.50) | 1174 (11.74) | 60 | 86 | 0  | 1  | 5   | 25  | 100 |
| 12 | 1011 (10.11) | 711 (7.11)   | 47 | 94 | 9  | 5  | 75  | 90  | 55  |
| 13 | 3060 (30.60) | 1995 (19.95) | 47 | 83 | 69 | 61 | 100 | 100 | 30  |
| 14 | 555 (5.55)   | 393 (3.93)   | 47 | 79 | 48 | 49 | 90  | 95  | 100 |
| 15 | 1364 (13.64) | 898 (8.98)   | 52 | 86 | 0  | 3  | 10  | 70  | 100 |
| 16 | 1569 (15.69) | 1086 (10.86) | 56 | 89 | 14 | 6  | 40  | 95  | 100 |
| 17 | 1348 (13.48) | 920 (9.20)   | 57 | 91 | 11 | 11 | 75  | 90  | 90  |
| 18 | 1360 (13.60) | 891 (8.91)   | 60 | 80 | 0  | 0  | 0   | 30  | 100 |
| 19 | 1492 (14.92) | 1078 (10.78) | 44 | 66 | 30 | 25 | 80  | 100 | 95  |
| 20 | 1285 (12.85) | 845 (8.45)   | 47 | 88 | 0  | 0  | 0   | 5   | 80  |

Table IV illustrates the physical characteristics attributable to each of the adhesive compositions shown in Table III. The peel values (PAFT) obtained for those compositions containing interpolymers having the lower densities are also lower than those compositions having interpolymers with higher densities. Even for lower density polymers, however, peel values (PAFT) which were superior over the commercially available compositions based on ethylene vinyl acetate could be obtained.

Examples 21 to 23

TABLE V

| | 0.870/1000 | Sample | Eastotac H130R | Petrolite PX-100 | Antioxidant | Viscosity at 135° C. |
|---|---|---|---|---|---|---|
|    | 33 | 21 | 34.7 | 27   | 0.3 | 1750 |
| 33 | 22 | 34.7 | 32 |      | 0.3 | 1130 |
| 23 | 33 | 10 | 24.7 | 33   | 0.3 | 1740 |

The homogeneous interpolymer used in the above examples, which has been described above, has a density of 0.870 g/cm³ and melt index of 1000 g/10 min. EAA 5980 is an ethylene acrylic acid sold under the tradename of Primacor® 5980 from Dow Chemical Co. Eastotac H130R is a 130° C. melt point hydrocarbon resin sold by the Eastman Chemical Co., Petrolite® PX-100 is a synthetic high melting point Fischer-Tropsch wax sold by Bareco, and the antioxidant Irganox 1010, a hindered phenolic antioxidant sold by Ciba-Geigy.

TABLE VI

| Sample | Bond (percent) 4.5° C. | Bond (percent) 23° C. | Bond (percent) 49° C. |
|---|---|---|---|
| 21 | 75 | 80 | 90 |
| 22 | 5  | 45 | 85 |
| 23 | 50 | 85 | 75 |
| D  | 5  | 65 | 95 |

Examples 21–23 were tested for bondability to high performance corrugated boardstock Comparative Example D is a commercially available ethylene vinyl acetate product designed for application temperatures of about 175° C. This product was applied to the substrate at 175° C. while Examples 21 to 23 were applied at 135° C. The figures in Table VI represent fiber tear as a percent of the total bond made. These examples illustrate that superior bonding performance can be obtained with the adhesives of the current invention while applying them at much lower temperatures than standard hot melt adhesives used in the packaging industry.

Hot melt adhesives comprising ultra-low molecular weight ethylene polymers were also prepared. The procedure for preparing the ultra-low molecular weight ethylene polymers is as follows.

Catalyst Preparation One

Part 1: Preparation of $TiCl_3(DME)_{1.5}$

The apparatus (referred to as R-1) was set-up in the hood and purged with nitrogen; it consisted of a 10 L glass kettle with flush mounted bottom valve, 5-neck head, polytetrafluoroethylene gasket, clamp, and stirrer components (bearing, shaft, and paddle). The necks were equipped as follows:stirrer components were put on the center neck, and the outer necks had a reflux condenser topped with gas inlet/outlet, an inlet for solvent, a thermocouple, and a stopper. Dry, deoxygenated dimethoxyethane (DME) was added to the flask (approx. 5 L). In the drybox, 700 g of $TiCl_3$ was weighed into an equalizing powder addition funnel; the funnel was capped, removed from the drybox, and put on the reaction kettle in place of the stopper. The $TiCl_3$ was added over about 10 minutes with stirring. After the addition was completed, additional DME was used to wash the rest of the $TiCl_3$ into the flask. The addition funnel was replaced with a stopper, and the mixture heated to reflux. The color changed from purple to pale blue. The mixture was heated for about 5 hours, cooled to room temperature, the solid was allowed to settle, and the supernatant was decanted from the solid. The $TiCl_3(DME)_{1.5}$ was left in R-1 as a pale blue solid.

Part 2: Preparation of $[(Me_4C_5)SiMe_2N-t-Bu][MgCl]_2$

The apparatus (referred to as R-2) was set-up as described for R-1, except that flask size was 30 L. The head was equipped with seven necks; stirrer in the center neck, and the outer necks containing condenser topped with nitrogen inlet/outlet, vacuum adapter, reagent addition tube, thermocouple, and stoppers. The flask was loaded with 4.5 L of toluene, 1.14 kg of (Me$_4$C$_5$H)SiMe$_2$NH-t-Bu, and 3.46 kg of 2Mi-PrMgCl in Et$_2$O. The mixture was then heated, and the ether allowed to boil off into a trap cooled to −78° C. After four hours, the temperature of the mixture had reached 75° C. At the end of this time, the heater was turned off and DME was added to the hot, stirring solution, resulting in the formation of a white solid. The solution was allowed to cool to room temperature, the material was allowed to settle, and the supernatant was decanted from the solid. The [(Me$_4$C$_5$)SiMe$_2$N-t-Bu][MgCl]$_2$ was left in R-2 as an off-white solid.

Part 3: Preparation of [($\eta^5$-Me$_4$C$_5$)SiMe$_2$N-t-Bu]TiMe$_2$

The materials in R-1 and R-2 were slurried in DME (3 L of DME in R-1 and 5 L in R-2). The contents of R-1 were transferred to R-2 using a transfer tube connected to the bottom valve of the 10 L flask and one of the head openings in the 30 L flask. The remaining material in R-1 was washed over using additional DME. The mixture darkened quickly to a deep red/brown color, and the temperature in R-2 rose from 21° C. to 32° C. After 20 minutes, 160 mL of CH$_2$Cl$_2$ was added through a dropping funnel, resulting in a color change to green/brown This was followed by the addition of 3.46 kg of 3 M MeMgCl in THF, which caused a temperature increase from 22° C. to 5° C. The mixture was stirred for 30 minutes, then 6 L of solvent was removed under vacuum. Isopar™ E hydrocarbon (6 L) was added to the flask. This vacuum/solvent addition cycle was repeated, with 4 L of solvent removed and 5 L of Isopar™ E hydrocarbon added. In the final vacuum step, an additional 1.2 L of solvent was removed. The material was allowed to settle overnight, then the liquid layer decanted into another 30 L glass kettle (R-3). The solvent in R-3 was removed under vacuum to leave a brown solid, which was re-extracted with Isopar E; this material was transferred into a storage cylinder. Analysis indicated that the solution (17.23 L) was 0.1534 M in titanium; this is equal to 2.644 moles of [($\eta^5$-Me$_4$C$_5$)SiMe$_2$N-t-Bu]TiMe$_2$. The remaining solids in R-2 were further extracted with Isopar™ E hydrocarbon, the solution was transferred to R-3, then dried under vacuum and re-extracted with Isopar™ E hydrocarbon. This solution was transferred to storage bottles; analysis indicated a concentration of 0.1403 M titanium and a volume of 4.3 L (0.6032 moles [($\eta^5$-Me$_4$C$_5$)SiMe$_2$N-t-Bu]TiMe$_2$). This gives an overall yield of 3.2469 moles of [($\eta^5$-Me$_4$C$_5$)SiMe$_2$N-t-Bu]TiMe$_2$, or 1063 g. This is a 72 percent yield overall based on the titanium added as TiCl$_3$.

Catalyst Preparation Two
Part 1: Preparation of TiCl$_3$(DME)$_{1.5}$

The apparatus (referred to as R-1) was set-up in the hood and purged with nitrogen; it consisted of a 10 L glass kettle with flush mounted bottom valve, 5-neck head, polytetrafluorethylene gasket, clamp, and stirrer components (bearing, shaft, and paddle). The necks were equipped as follows: stirrer components were put on the center neck, and the outer necks had a reflux condenser topped with gas inlet/outlet, an inlet for solvent, a thermocouple, and a stopper. Dry, deoxygenated dimethoxyethane (DME) was added to the flask (approx. 5.2 L). In the drybox, 300 g of TiCl$_3$ was weighed into an equalizing powder addition funnel; the funnel was capped, removed from the drybox, and put on the reaction kettle in place of the stopper. The TiCl$_3$ was added over about 10 minutes with stirring. After the addition was completed, additional DME was used to wash the rest of the TiCl$_3$ into the flask. This process was then repeated with 325 g of additional TiCl$_3$, giving a total of 625 g. The addition funnel was replaced with a stopper, and the mixture heated to reflux. The color changed from purple to pale blue. The mixture was heated for about 5 hours, cooled to room temperature, the solid was allowed to settle, and the supernatant was decanted from the solid. The TiCl$_3$(DME)$_{1.5}$ was left in R-1 as a pale blue solid.

Part 2: Preparation of [(Me$_4$C$_5$)SiMe$_2$N-t-Bu][MgCl]$_2$

The apparatus (referred to as R-2) was set-up as described for R-1, except that flask size was 30 L. The head was equipped with seven necks; stiffer in the center neck, and the outer necks containing condenser topped with nitrogen inlet/outlet, vacuum adapter, reagent addition tube, thermocouple, and stoppers. The flask was loaded with 7 L of toluene, 3.09 kg of 2.17 M i-PrMgCl in Et$_2$O, 250 mL of THF, and 1.03 kg of (Me$_4$C$_5$H)SiMe$_2$NH-t-Bu. The mixture was then heated, and the ether allowed to boil off into a trap cooled to −78° C. After three hours, the temperature of the mixture had reached 80° C., at which time a white precipitate formed. The temperature was then increased to 90° C. over 30 minutes and held at this temperature for 2 hours. At the end of this time, the heater was turned off, and 2 L of DME was added to the hot, stirring solution, resulting in the formation of additional precipitate. The solution was allowed to cool to room temperature, the material was allowed to settle, and the supernatant was decanted from the solid. An additional wash was done by adding toluene, stirring for several minutes, allowing the solids to settle, and decanting the toluene solution. The [(Me$_4$C$_5$)SiMe$_2$N-t-Bu][MgCl]$_2$ was left in R-2 as an off-white solid.

Part 3: Preparation of [($\eta^5$-Me$_4$C$_5$SiMe$_2$N-t-Bu]Ti($\eta^4$-1.3pentadiene)

The materials in R-1 and R-2 were slurried in DME (the total volumes of the mixtures were approximately 5 L in R-1 and 12 L in R-2). The contents of R-1 were transferred to R-2 using a transfer tube connected to the bottom valve of the 10 L flask and one of the head openings in the 30 L flask. The remaining material in R-1 was washed over using additional DME. The mixture darkened quickly to a deep red/brown color. After 15 minutes, 1050 mL of 1,3-pentadiene and 2.60 kg of 2.03 M n-BuMgCl in THF were added simultaneously. The maximum temperature reached in the flask during this addition was 53° C. The mixture was stirred for 2 hours, then approximately 11 L of solvent was removed under vacuum. Hexane was then added to the flask to a total volume of 22 L. The material was allowed to settle, and the liquid layer (12 L) was decanted into another 30 L glass kettle (R-3). An additional 15 liters of product solution was collected by adding hexane to R-2, stirring for 50 minutes, again allowing to settle, and decanting. This material was combined with the first extract in R-3. The solvent in R-3 was removed under vacuum to leave a red/black solid, which was then extracted with toluene. This material was transferred into a storage cylinder. Analysis indicated that the solution (11.75 L) was 0.255 M in titanium; this is equal to 3.0 moles of [($\eta^5$-Me$_4$C$_5$)SiMe$_2$N-t-Bu]Ti($\eta^4$-1,3-pentadiene) or 1095 g. This is a 74 percent yield based on the titanium added as TiCl$_3$.

Polymerization of Ultra-Low Molecular Weight Polymers and Waxes

The polymers used in the preparation of the hot melt adhesives of the invention were prepared in accordance with the following procedure and utilizing the reaction conditions set forth in Table One.

The ethylene and the hydrogen were combined into one stream before being introduced into the diluent mixture, a mixture of $C_8$–$C_{10}$ saturated hydrocarbons, e.g., ISOPAR-E hydrocarbon mixture (available from Exxon Chemical Company) and the comonomer. The comonomer was 1-octene. The reactor feed mixture was continuously injected into the reactor.

The metal complex and cocatalysts were combined into a single stream and were also continuously injected into the reactor. For Polymer A, the catalyst was as prepared in Catalyst Preparation One set forth above. For the remaining polymers and the wax, the catalyst was as prepared in Catalyst Preparation Two set forth above. For each Polymer and Wax, the co-catalyst was tris(pentafluorophenyl)borane, available as a 3 weight percent solution in Isopar™-E mixed hydrocarbon, from Boulder Scientific. Aluminum was provided in the form of a solution of modified methylalumoxane (MMAO Type 3A) in heptane, which is available at a 2 wt percent aluminum concentration from Akzo Nobel Chemical Inc.

Sufficient residence time was allowed for the metal complex and cocatalyst to react prior to introduction into the polymerization reactor. In each polymerization reaction, the reactor pressure was held constant at about 475 psig (3.3 MPa). Ethylene content of the reactor, in each polymerization, after reaching steady state, was maintained at the conditions specified in Table One.

After polymerization, the reactor exit stream was introduced into a separator where the molten polymer is separated from the unreacted comonomer(s), unreacted ethylene, unreacted hydrogen, and diluent mixture stream. The molten polymer was subsequently strand chopped or pelletized, and, after being cooled in a water bath or pelletizer, the solid pellets were collected. Table VII describes the polymerization conditions and the resultant polymer properties of Polymers A, B, C, and D.

Polymers F, F, G, and Wax A were produced in a solution polymerization process using a well-mixed recirculating loop reactor.

The ethylene and the hydrogen (as well as any ethylene and hydrogen which were recycled from the separator, were combined into one stream before being introduced into the diluent mixture, a mixture of $C_8$–$C_{10}$ saturated hydrocarbons, e.g., Isopar™-E hydrocarbon (available from Exxon Chemical Company) and the comonomer 1-octene.

The metal complex and cocatalysts were combined into a single stream and were also continuously injected into the reactor. The catalyst was as prepared in Catalyst Description Two set forth above; the primary cocatalyst was tri(pentafluorophenyl)borane, available from Boulder Scientific as a 3 weight percent solution in ISOPAR-E mixed hydrocarbon; and the secondary cocatalyst was modified methylalumoxane (MMAO Type 3A), available from Akzo Nobel Chemical Inc. as a solution in heptane having 2 weight percent aluminum.

Sufficient residence time was allowed for the metal complex and cocatalyst to react prior to introduction into the polymerization reactor. The reactor pressure was held constant at about 475 psig (3.3 MPa).

After polymerization, the reactor exit stream was introduced into a separator where the molten polymer was separated from the unreacted comonomer(s), unreacted ethylene, unreacted hydrogen, and diluent mixture stream, which was in turn recycled for combination with fresh comonomer, ethylene, hydrogen, and diluent, for introduction into the reactor. The molten polymer was subsequently strand chopped or pelletized, and, after being cooled in a water bath or pelletizer, the solid pellets were collected. Tables VIII and IX describe the polymerization conditions and the resultant polymer properties of Polymers E, F, G, and Wax A.

TABLE VII

|  | Polymer A | Polymer B | Polymer C | Polymer D |
| --- | --- | --- | --- | --- |
| Total Ethylene feed (lb/hr (kg/hr)) | 2.0 (0.91) | 3.0 (1.4) | 2.5 (1.2) | 2.5 (1.2) |
| Fresh Ethylene feed (lb/hr (kg/hr)) | 2.0 (0.91) | 3.0 (1.4) | 2.5 (1.2) | 2.5 (1.2) |
| Total comonomer feed (lb/hr (kg/hr)) | 2.3 (1.04) | 1.9 (0.86) | 2.8 (1.3) | 2.8 (1.3) |
| Fresh comonomer feed (lb/hr (kg/hr)) | 2.3 (1.04) | 1.9 (0.86) | 2.8 (1.3) | 2.8 (1.3) |
| Comonomer olefin ratio (mole percent) | 12.5 | 9.7 | 13.2 | 13.2 |
| Hydrogen:ethylene ratio (mole percent) | 0.49 | 0.77 | 0.33 | 0.79 |
| Diluent ethylene ratio (weight basis) | 11.1 | 8.6 | 5.9 | 5.9 |
| Catalyst metal concentration (ppm) | 4 | 3 | 4 | 4 |
| Catalyst flow rate (lb/hr (kg/hr)) | 0.32 (0.14) | 0.71 (0.32) | 0.46 (0.21) | 0.65 (0.30) |
| Co-catalyst concentration (ppm) | 88 | 88 | 30.8 | 30.8 |
| Co-catalyst flow rate (lb/hr (kg/hr)) | 0.46 (0.21) | 0.77 (0.35) | 0.43 (0.20) | 0.59 (0.27) |
| Aluminum concentration (ppm) | 9.8 | 9.8 | 19.8 | 19.8 |
| Aluminum flow rate (lb/hr (kg/hr)) | 0.44 (0.20) | 0.73 (0.33) | 0.0 (0) | 0.0 (0) |
| Reactor temperature (° C.) | 110 | 120 | 110 | 110 |
| Ethylene concentration in reactor exit stream (weight percent) | 1.69 | 1.92 | 3.55 | 3.55 |
| Polymer density (g/cm$^3$) | 0.871 | 0.894 | 0.871 | 0.872 |
| Polymer melt viscosity at 350° F. (177° C.) (centipoise (grams/(cm · second)) | 4200 (42) | 2000 (20) | 23,000 (230) | 1800 (18) |

TABLE VIII

|  | Polymer E | Polymer F | Wax A |
|---|---|---|---|
| Ethylene fresh feed rate (lbs/hr (kg/hr)) | 140 (63.6) | 140 (63.6) | 140 (63.6) |
| Total ethylene feed rate (lbs/hr (kg/hr)) | 146.2 (66.45) | 146.17 (66.44) | 146.5 (66.59) |
| Fresh octene feed rate (lbs/hr (kg/hr)) | 45.4 (20.6) | 49.5 (22.5) | 12.67 (5.76) |
| Total octene feed rate (lbs/hr (kg/hr)) | Not determined | 112 (50.9) | 32.9 (14.95) |
| Total octene concentration (weight percent) | Not determined | 11.4 | 3.36 |
| Fresh hydrogen feed rate (standard $cm^3$/min.) | 4025 | 5350 | 16100 |
| Solvent and octene feed rate (lbs/hr (kg/hr)) | 840 (382) | 839.4 (381.5) | 840 (382) |
| Ethylene conversion rate (wt percent) | 90.7 | 90.3 | 88.26 |
| Reactor temperature (° C.) | 109.86 | 119.8 | 134.3 |
| Feed temperature (° C.) | 15 | 15 | 15.3 |
| Catalyst concentration (ppm) | 70 | 70 | 70 |
| Catalyst flow rate (lbs/hr (kg/hr)) | 0.725 (0.330) | 1.265 (0.575) | 4.6 (2.09) |
| Primary cocatalyst concentration (ppm) | 1200 | 2031 | 1998 |
| Primary cocatalyst flow rate (lbs/hr (kg/hr)) | 2.96 (1.34) | 1.635 (0.743) | 5.86 (2.66) |
| Titanium:boron molar ratio | 2.96 | 3.48 | 2.897 |
| Secondary cocatalyst concentration (ppm) | 198 | 198 | 198 |
| Secondary cocatalyst flow rate (lbs/hr (kg/hr)) | 0.718 (0.326) | 1.258 (0.572) | 3.7 (1.7) |
| Titanium:aluminum molar ratio | 5 | 4.986 | 4.037 |
| Product density (g/$cm^3$) | 0.8926 | 0.8925 | 0.9369 |
| Product melt viscosity at 350° F. (centipoise (grams/(cm · second)) | 12,500 (125) | 4,000 (40) | 400 (4) |
| Polymer melt index ($I_2$ at 190° C.)* | 686* | 1,900* | 14,000* |
| Polymer Mn | 12,300* | 8,900* | 4,700* |

*Calculated on the basis of melt viscosity correlations in accordance with the formulas: $I_2 = 3.6126(10^{\log(\eta) - 6.6928)/-1.1363}) - 9.3185$, $Mn = 10^{[(\log \eta + 10.46)/3.56]}$ where $\eta$ = melt viscosity at 350° F. (177° C.).

TABLE IX

|  | Polymer G |
|---|---|
| Total Ethylene feed (lb/hr (kg/hr)) | 110 (50) |
| Fresh Ethylene feed (lb/hr (kg/hr)) | 105 (47.7) |
| Total comonomer feed (lb/hr (kg/hr)) | 124.5 (56.6) |
| Fresh comonomer feed (lb/hr (kg/hr)) | 61.5 (28.0) |
| Comonomer:olefin ratio (mole percent) | 13.3 |
| Hydrogen:ethylene ratio (mole percent) | 0.49 |
| Diluent ethylene ratio (weight basis) | 6.0 |
| Catalyst metal concentration (ppm) | 20 |
| Catalyst flow rate (lb/hr (kg/hr)) | 3.6 (1.64) |
| Co-catalyst concentration (ppm) | 1500 |
| Co-catalyst flow rate (lb/hr (kg/hr)) | 1.5 (0.68) |
| Aluminum concentration (ppm) | 125 |
| Aluminum flow rate (lb/hr (kg/hr)) | 1.6 (0.73) |
| Reactor temperature (° C.) | 120 |
| Ethylene concentration in reactor exit stream (weight percent) | 1.74 |
| Polymer density(g/$cm^3$) | 0.88 |
| Polymer melt viscosity at 350° F. (177° C.) (centipoise (grams/(cm · second)) | 5000 |

Hot Melt Adhesives With Enhanced Low Temperature Performance Which Comprise at Least One Ultralow Molecular Weight Ethylene Polymer The polymers, tackifier, wax, and antioxidant were simultaneously added in the amounts indicated in Table A to a Haake Rheocord 40 mixer using a 200 g mixing bowl maintained at about 130° C. at 95 revolutions per minute. The ingredients were mixed for about 5 minutes, until they became molten. The antioxidant employed was Irganox™ 1010, and was employed in an amount of 2000 ppm, based on the total formulation.

Table X further sets forth various measured performance attributes of the hot melt adhesives, including melt viscosity at 350° F. (177° C.), close time, open time, PAFT, percent paper tear of the newly made hot melt adhesive (initial paper tear) for samples aged 14 days at 50° C. (14 day paper tear at 50° C.). Each of the examples exhibited greater than 90 percent initial paper tear. Examples 25, 26, and 27 further exhibited greater than 90 percent 14 day paper tear. Each of the examples exhibited acceptable PAFT, and, for most applications, further exhibited suitable open and close times.

TABLE X

|  | Sample 24 |  | Sample 25 |  | Sample 26 | Sample 27 |
|---|---|---|---|---|---|---|
| Polymer D (4000 cps, .893 g/cc) (wt. percent) | 43.4 | Polymer A (4200 cps, .871 g/cc) (wt. percent) | 47.5 | Polymer C (1800 cps, .872 g/cc (wt. percent) | 62.4 | 47.5 |
| Wax A (400 cps, .937 g/cc) (wt. percent) | 34.7 | 150 cps, .925 (wt percent) ultralow molecular weight ethylene/octene wax having a density of 0.925 g/$cm^3$ and a melt viscosity at 177° C. of 150 cps (1.5 grams/(cm · second)) | 38 | Wax A (400 cps, .937 g/cc) (wt. percent) | 9.99 | 38 |
| Piccotac 115 (wt. percent) | 21.7 | Piccotac 115 (wt percent) | 14.3 | Piccotac 115 (wt percent) | 27.4 | 14.3 |
| Viscosity 350° F. (177° C.) (cps (grams/cm · second)) | 1275 (12.75) | Viscosity 350° F. (177° C.) (cps (grams/cm · second)) | 1032 (10.32) | Viscosity 350° F. (177° C.) (cps (grams/cm · second)) | 972 (9.72) | 782 (7.82) |
| Close Time (sec) | 5 | Close Time (sec) | 15 | Close Time (sec) | 20 | 20 |
| Open Time (sec) | 25 | Open Time (sec) | 25 | Open Time (sec) | 40 | 10 |
| PAFT (C/mode) (° C.) | 98 | PAFT (C/mode) | 87.5 | PAFT (C/mode) | 88 | 93 |

TABLE X-continued

| | Sample 24 | | Sample 25 | | Sample 26 | Sample 27 |
|---|---|---|---|---|---|---|
| Paper tear - initial (percent) | 97.00 | Paper tear - initial (percent) | 99 | Paper tear - initial percent) | 100 | 98 |
| Paper tear - 14 days (room temp) (percent) | 70 | Paper tear - 14 days (room temp) (percent) | 100 | Paper tear - 14 days (room temp) (percent) | 100 | 98 |
| Paper tear - 14 days 50C (percent) | 40.00 | Paper tear - 14 days 50C (percent) | 100 | Paper tear - 14 days 50C (percent) | 100 | 99 |
| PAFT (° C.) | 51.7 | PAFT (° C.) | 28.5 | PAFT (° C.) | 43 | 25.2 |
| SAFT (° C.) | 98.9 | SAFT (° C.) | 95 | SAFT (° C.) | 73.3 | 98.9 |

Table XI illustrates the improvement in low temperature viscosity of the hot melt adhesives of the invention as compared to that of high vinyl acetate content EVA-based hot melt adhesive formulations having a comparable melt viscosity at 350° F. (177° C.). In each column, the viscosity in centipoise is first reported, with the viscosity in grams/(cm.second) being indicated in the parentheticals.

life. In applications where short close times are desired, the hot melt adhesives of the invention are particularly advantageous. The hot melt adhesives of the invention are further expected to create less angel hair during processing, despite the application at low temperatures.

TABLE XI

| Temp (° F. (° C.)) | 27 | Fuller 4316 | 24 | 26 | 25 | Fuller 5754 | East A765 | Nat'l Strch 2103 |
|---|---|---|---|---|---|---|---|---|
| 275 | 2199 | 2665 | 3650 | 3380 | 3220 | 5750 | 3300 | 3000 |
| (135) | (21.99) | (26.65) | (36.50) | (33.80) | (32.20) | (57.50) | (33.60) | (30.00) |
| 300 | 1495 | 1625 | 2455 | 2485 | 2075 | 2740 | 2090 | 1800 |
| (154) | (14.95) | (16.25) | (24.55) | (24.85) | (20.75) | (27.40) | (20.90) | (18.00) |
| 325 | 1117 | 1063 | 1715 | 1385 | 1462 | 1572 | 1430 | 1212 |
| (163) | (11.17) | (10.63) | (17.15) | (13.85) | (14.62) | (15.72) | (14.30) | (12.12) |
| 350 | 782 | 703 | 1335 | 992.5 | 1092 | 1020 | 1045 | 935 |
| (177) | (7.82) | (7.03) | (13.35) | (9.925) | (10.92) | (10.20) | (10.45) | (9.35) |

In particular, Table XI shows that while the hot melt adhesives of Example 27 and Fuller 4316 each have a melt viscosity at 350° F. (177° C.) of between 700 and 800 centipoise (7 and 8 grams/(cm.second)), Example 27 has a melt viscosity at 275° F. (1 35° C.) which is over 400 centipoise (4 grams/cm.second) less than that of the commercially available adhesive Fuller 4316. Similarly, Fuller 5754, and Examples 24–26 each have a melt viscosity at 350° F. (177° C.) which is between about 1000 and about 1300 centipoise (10 and 13 grams/cm.second). In contrast, each of Examples 24–26 have a melt viscosity at 275° F. (135° C.) which is significantly less than that of Fuller 5754. While comparative hot melt adhesives Eastman A765 and National Starch 2103 have acceptable melt viscosities at 275° F. (135° C.), they are not believed to be optimal packaging adhesives, as their high level of crystallinity will cause embrittlement at lower temperatures.

The reduced low temperature melt viscosity of the hot melt adhesives of the invention will translate to lower operating temperatures, which is advantageous from the perspective of economics, as well as affording improved pot Various hot melt adhesives which will be preferred for bonding cardboard and paperboard substrates have likewise been developed, and are set forth as following.

Hot Melt Adhesives Comprising a Homogeneous Ethylene Polymer Having a Melt Viscosity at 350° F. (177° C.) of 5000 Centipoise (50 grams/(cm.second)) and a Density of 0.880 to 0.895 g/cm³

The polymers, tackifier, wax, and antioxidant were simultaneously added in the amounts indicated in Table XII to a Haake Rheocord 40 mixer using a 200 gram mixing bowl maintained at about 130° C. at 95 revolutions per minute. The ingredients were mixed for about 5 minutes, until they became molten. The antioxidant employed was Irganox™ 1010 hindered phenolic stabilizer, and was employed in an amount of 2000 ppm, based on the total formulation.

The resultant hot melt adhesives were evaluated for initial, 14 day paper tear at room temperature, and 14 day paper tear at 50° C., close time, open time, and PAFT. The formulations of the hot melt adhesives evaluated, as well as the data obtained, are set forth in Table XII.

TABLE XII

RESPONSE SURFACE MODEL
FOR POLYMER F (0.893 G/CC, 4000 CPS) WAX A (0.937 G/CC, 400 CPS) PICCOTAC 115

| DIAGRAM # | 1 | 2 | A | 4 | 5 | 6 | 7 | 8 | 11 | G | J | X | 1C | 1A |
|---|---|---|---|---|---|---|---|---|---|---|---|---|---|---|
| Sample No. | 28 | 29 | 30 | 31 | 32 | 33 | 34 | 35 | 36 | 37 | 38 | 39 | 40 | 41 |
| Polymer F (0.890 g/cc 4000 cps) | 84.8 | 32.4 | 27.9 | 43.5 | 62.4 | 25 | 47.5 | 49.9 | 43.4 | 34.4 | 60.2 | 43.5 | 69.9 | 99.8 |

TABLE XII-continued

RESPONSE SURFACE MODEL
FOR POLYMER F (0.893 G/CC, 4000 CPS) WAX A (0.937 G/CC, 400 CPS) PICCOTAC 115

| DIAGRAM # | 1 | 2 | A | 4 | 5 | 6 | 7 | 8 | 11 | G | J | X | 1C | 1A |
|---|---|---|---|---|---|---|---|---|---|---|---|---|---|---|
| Sample No. | 28 | 29 | 30 | 31 | 32 | 33 | 34 | 35 | 36 | 37 | 38 | 39 | 40 | 41 |
| Wax A (400 cps, .937 g/cc) | 10 | 17.5 | 65.1 | 43.5 | 10 | 47.4 | 47.5 | 49.9 | 34.7 | 51.6 | 25.8 | 43.5 | | |
| Piccotac 115 | 5 | 49.9 | 7 | 13 | 27.4 | 27.4 | 5 | 0 | 21.7 | 14 | 14 | 13 | 29.9 | |
| Viscosity at 350° F. | 3885 | 951 | 1020 | 1182 | 2070 | 780 | 1345 | 1575 | 1275 | 1170 | 2007 | 1182 | 2860 | 5235 |
| Close Time (sec) | 5 | 5 | 5 | 5 | 5 | 5 | 10 p | no PT | 5 | 5 | 5 | 5 | 5 | 5 |
| Open Time (sec) | 15 | 30 | 5 | 25 | 25 | 25 | 15 | 15 | 25 | 10 | 25 | 25 | 40 | 10 |
| PAFT (C/mode) | 105c,a | 100/a | 110/aH | 105/a | 85/a | 100/a | 103/a | 97.5/a | 98/c? | 100/aH | 95/aH | 105/a | 85/c | 82.5/a |
| DENSITY | 0.898 | 0.936 | 0.921 | 0.917 | 0.915 | 0.93 | 0.912 | 0.91 | 0.92 | 0.921 | 0.911 | 0.917 | | |
| CRST'Y | 35 | 24 | 49 | 39 | 28 | 39 | 41 | 43 | 34 | 46 | 38 | 39 | 26 | 30 |
| PT - Initial (%) | 80 | 97 | 22 | 22 | 92 | 53 | 65 | 0 | 97 | 35 | 69 | 22 | 100 | 87 |
| PT14 - 14 days 50C (%) | 97 | 0 | 6 | 34 | 77 | 18 | 11 | 0 | 40 | 11 | 87 | 34 | 90 | 85 |
| PT14 - 14 days @ r.t. (%) | 97 | 83 | 7 | 15 | 99 | 75 | 51 | 0 | 70 | 26 | 93 | 15 | 100 | 80 |

*PT refers to Paper Tear

Preferred hot melt adhesives, that is, those which exhibit at least 80 percent initial paper tear, are characterized as corresponding to the following inequality derived from a statistical model:

Paper Tear≧83.8965*A+18.5823*C+114.571*B where A, B, and C are percent composition of polymer, tackifier and wax, respectively.

Such preferred HMA's include HMA's corresponding to the diagram points set forth in Table XII: 1, 1A, 1C, 1F, 5, 11, and 2. Such preferred HMA's will generally have the following formulation: greater than 25 weight percent of the homogeneous linear or substantially linear ethylene polymer, 0 to 35 weight percent wax, and 0 to 50 weight percent tackifier, with the proviso that when the tackifier is present in an amount less than 20 weight percent, the homogeneous linear or substantially linear ethylene polymer is present in an amount of at least 50 weight percent.

More preferred hot melt adhesives, that is, those which exhibit at least 80 percent 14 day room temperature paper tear, are characterized as corresponding to the following inequality derived from a statistical model:

Paper Tear≧102.902*A−9.96395*C+80.2846*B+164.944*B*C where A, B, and C are percent composition of polymer, tackifier, and wax, respectively.

Such more preferred hot melt adhesives include hot melt adhesives represented by the following diagram points in Table XII: 1, 1A, 1C, 2, 5, and J. Such preferred hot melt adhesives will generally have the following formulation: 0 to 25 weight percent wax, 30 to 100 weight percent of the homogeneous linear or substantially linear ethylene polymer, and 0 to 50 weight percent tackifier, with the proviso that when the tackifier is present in an amount less than 5 weight percent, the polymer is present in an amount greater than 80 weight percent.

Most preferred hot melt adhesives, that is, those which exhibit at least 80 percent 14 day paper tear at 50° C., are characterized as corresponding to the following inequality derived from a statistical model:

Paper Tear≧102.73*A−6.07393*C−49.4636B−69.4347*A*C+143.137*A*B+127.72*B*C where A, B, and C are percent composition of polymer, tackifier, and wax respectively. Such most preferred hot melt adhesives include hot melt adhesives corresponding to the following diagram points in Table C: 1, 1A, 1C, 1F, 5, and J. Such preferred hot melt adhesives will generally have the following formulation: 0 to 25 weight percent wax, 60 to 100 weight percent polymer, and 0 to 30 weight percent tackifier, with the proviso that when the tackifier is present in an amount less than 5 weight percent, the polymer is present in an amount greater than about 80 weight percent.

Hot Melt Adhesives Comprising Homogeneous Ethylene Polymer Having a Melt Viscosity at 350° F. (177° C.) of 5000 Centipoise (50 grams/(cm.second)) and a Density of 0.865 to Less Than 0.880 g/cm³

The polymers, tackifier, wax, and antioxidant were simultaneously added in the amounts indicated in Table XIII to a Haake Rheocord 40 mixer using a 200 gram mixing bowl maintained at about 130° C. at 95 revolutions per minute. The ingredients were mixed for about 5 minutes, until they became molten. The antioxidant employed was Irganox™ 1010 hindered phenolic stabilizer, and was employed in an amount of 2000 ppm, based on the total formulation.

The resultant hot melt adhesives were evaluated for initial, 14 day paper tear at room temperature, and 14 day paper tear at 50° C., close time, open time, and PAFT. The formulations of the hot melt adhesives evaluated, as well as the data obtained, are set forth in Table XIII.

TABLE XIII

| DIAGRAM # | 1 | 2 | 3 | 4 | 5 | 6 | 7 | 8 | 9 | 9 |
|---|---|---|---|---|---|---|---|---|---|---|
| Sample | 42 | 43 | 44 | 45 | 46 | 47 | 48 | 49 | 50 | 51 |
| Polymer A (4200 cps, .871 g/cc) (wt percent) | 84.8 | 32.4 | 25 | 43.4 | 62.4 | 25 | 47.5 | 49.9 | 47.5 | 47.5 |
| Wax A (400 cps, .937 g/cc) (wt percent) | | 10 | 17.5 | 69.9 | 43.4 | 10 | 47.4 | 47.5 | 49.9 | 38 |

TABLE XIII-continued

| | | | | | | | | | | |
|---|---|---|---|---|---|---|---|---|---|---|
| Wax B (400 cps, .968 g/cc) (wt percent) | — | — | — | — | — | — | — | — | — | 38 |
| Piccotac 115 (wt percent) | 5 | 49.9 | 5 | 13 | 27.4 | 27.4 | 4.8 | 0 | 14.3 | 14.3 |
| Viscosity at 350° F. (177° C.) centipoise (grams/(cm · second) | 4087 (40.87) | 906 (9.06) | 916.5 (9.17) | 1252 (12.52) | 2157 (21.57) | 694.5 (6.95) | 1490 (14.90) | 1720 (17.20) | 1392 (13.92) | 1452 (14.52) |
| Close Time (sec) | 5 | 5 | 5 | 5 | 5 | 5 | 5 | 5 | 5 | 15 |
| Open Time (sec) | 30 | 25 | 15 | 25 | 30 | 25 | 25 | 20 | 20 | 10 |
| PAFT (C/mode) (° C.) | 110/c | 85/a | 105/a | 92.5/a | 110/c | 100/a | 97.5/a | 95/a | 92.5/a | 82.5/a |
| DENSITY (g/cm³) | 0.88 | 0.928 | 0.916 | 0.908 | 0.902 | 0.925 | 0.902 | 0.899 | 0.906 | |
| CRYSTALLINITY (percent) | 16.80 | 11.60 | 44.90 | 31.00 | 16.20 | 34.70 | 34.30 | 36.10 | 27.80 | |
| PT* - initial (percent) | 100 | 100 | 36 | 76 | 100 | 68 | 46 | 0 | 100 | 98 |
| PT14 - 14 days 50° C. (percent) | 70 | 100 | 30 | 97 | 100 | 69 | 73 | 0 | 97 | 96 |
| PT14 - 14 days at room temperature (percent) | 83 | 100 | 47 | 98 | 100 | 72 | 83 | 0 | 100 | 95 |

| | | | | | | | | | | |
|---|---|---|---|---|---|---|---|---|---|---|
| DIAGRAM # | 9 | 9 | 9 | 9 | 9 | 10 | 1B | 1C | 1A | 1D |
| Sample | 52 | 53 | 54 | 55 | 56 | 57 | 58 | 59 | 60 | 61 |
| Polymer A (4200 cps, .871 g/cc) (wt percent) | 47.5 | 47.5 | 47.5 | 47.5 | 47.5 | 39.9 | 69.9 | 69.9 | 99.8 | 67.47 |
| Wax A (400 cps, .937 g/cc) (wt percent) | | | | | | 47.9 | 29.9 | | | 27.45 |
| Wax C (140 cps, .89 g/cc) (wt percent) | 38 | | | | | | | | | |
| Wax D (800 cps, .89 g/cc) (wt percent) | | 38 | | | | | | | | |
| Wax E (150 cps, .925 g/cc) (wt percent) | | | 38 | | | | | | | |
| Wax F (800 cps, .925 g/cc) (wt percent) | | | | 38 | | | | | | |
| Wax G (350 cps, .89 g/cc) (wt percent) | | | | | 38 | | | | | |
| Piccotac 115 (wt percent) | 14.3 | 14.3 | 14.3 | 14.3 | 14.3 | 12 | | 29.9 | | 4.99 |
| Viscosity at 350° F. (177° C.) centipoise (grams/(cm · second) | 1044 (10.44) | 1740 (17.40) | 1032 (10.32) | 1720 (17.20) | 1407 (14.07) | 1135 (11.35) | 2960 (29.60) | 2950 (29.50) | 4942 (49.42) | 2505 (25.05) |
| Close Time (sec) | 20 | 20 | 15 | 5 | 20 | 5 | 5 | 15 | >30 | 20 |
| Open Time (sec) | 35 | 30 | 25 | 20 | 30 | 25 | 25 | 40 | 25 | 15 |
| PAFT (C/mode) (° C.) | 90/c | 80/ca | 87.5/a | 95/a | 77/ca | 110/c,a | 97.5/a | 80/c | 60/a | 87.5/a |
| DENSITY (g/cm³) | | | | | | 0.91 | | | | |
| Crystallinity (percent) | | | | | | 33.20 | 25.5 | 12.1 | 11.9 | 28.8 |
| PT* - initial (percent) | 96 | 98 | 99 | 99 | 95 | 100 | 73 | 100 | 36 | 83 |
| PT14 - 14 days 50° C. (percent) | 94 | 100 | 100 | 100 | 100 | 97 | 80 | 100 | 60 | 70 |
| PT14 - 14 days at room temperature (percent) | 98 | 100 | 100 | 100 | 100 | 100 | 41 | 100 | 18 | 57 |

*PT refers to Paper Tear

Preferred hot melt adhesives, i.e., those which exhibit at least 80 percent initial paper tear, are characterized as corresponding to the following inequality derived from a statistical model:

Paper Tear≧101.746*A+38.2428*C+86.0133*B−56.2418*A*C+ 55.2941*B*C+1350.15*A*B*C

Where A, B, and C are percent composition of polymer, tackifier, and wax respectively. Such preferred hot melt adhesives include hot melt adhesives corresponding to the following diagram numbers set forth in Table D: 1, 1C, 1D, 5, 2, 9, and 10. Such preferred hot melt adhesives will generally have the following formulation: 25 to 85 weight percent of the homogeneous linear or substantially linear ethylene polymer, 0 to 50 weight percent wax, and 5 to 50 weight percent tackifier, with the proviso that when the tackifier is present in an amount less than 20 weight percent, the polymer is present in an amount of at least 35 weight percent.

More preferred hot melt adhesives, that is, those which exhibit greater than 80 percent 14 day paper tear at room temperature, include hot melt adhesives corresponding to the following diagram points in Table C: 1, 2, 4, 5, 7, 9, 10, and 1C. Such more preferred hot melt adhesives will generally have the following formulation: 25 to 85 weight percent of the homogeneous linear or substantially linear ethylene polymer, 0 to 50 weight percent wax, and 5 to 50 weight percent tackifier, with the proviso that when the tackifier is present in an amount less than 10 weight percent, the polymer is present in an amount of at least 40 weight percent.

Most preferred hot melt adhesives, that is, those which exhibit at least 80 percent 14 day paper tear at 50° C., are characterized as corresponding to the following inequality derived from a statistical model:

Paper Tear≧102.73*A−6.07373*C−49.4636*B−69.4347*A*C+ 143.137*A*B+127.72*B*C where A, B, and C are the weight percents of the polymer, tackifier, and wax present in the hot melt adhesive, respectively. Such most preferred hot melt adhesives include hot melt adhesives corresponding to the following diagram points in Table C: 2, 4, 5, 9, 10, 1B, and 1C. Such preferred hot melt adhesives will generally have the following formulation: 0 to 50 weight percent wax, 25 to 70 weight percent polymer, and 0 to 50 weight percent tackifier, with the proviso that when the tackifier is present in an amount less than 5 weight percent, the polymer is present in an amount greater than 50 weight percent. It is further notable that when a polymer having a density of from 0.865 to less than 0.875 g/cm³ is employed, the range of acceptable formulation ratios is greatly expanded over the acceptable range when a polymer having a higher density is employed. Hot Melt Adhesives Comprising a Homogeneous Ethylene Polymer Having a Melt Viscosity at 350° F. (177° C.) of 2500 Centipoise (25 grams/(cm.second)) and a Density of 0.880 to 0.895 g/cm³

The polymers, tackifier, wax, and antioxidant were simultaneously added in the amounts indicated in Table XIV to a Haake Rheocord 40 mixer using a 200 gram mixing bowl maintained at about 130° C. at 95 revolutions per minute. The ingredients were mixed for about 5 minutes, until they became molten. The antioxidant employed was Irganox™ 1010 hindered phenolic stabilizer, and was employed in an amount of 2000 ppm, based on the total formulation.

The resultant hot melt adhesives were evaluated for initial, 14 day paper tear at room temperature, and 14 day paper tear at 50° C., close time, open time, and PAFT. The formulations of the hot melt adhesives evaluated, as well as the data obtained, are set forth in Table XIV.

ferred hot melt adhesives corresponding to the diagram points 1, 1C, 1D, and 4 in Table E will generally have the following formulation: 40 to 85 weight percent of the homogeneous linear or substantially linear ethylene polymer, 0 to 45 weight percent wax, and 5 to 30 weight percent tackifier, with the proviso that when the tackifier is present in an amount less than 10 weight percent, the polymer is present in an amount greater than 50 weight percent.

Hot Melt Adhesives Comprising a Homogeneous Ethylene Polymer Having a Melt Viscosity at 350° F. (177° C.) of

TABLE XIV

| DIAGRAM # | 1 | | 4 | | 1A | | |
|---|---|---|---|---|---|---|---|
| Sample | 62 | 63 | 64 | 65 | 66 | 67 | 68 |
| Polymer B (2000 cps, .894 g/cc) wt. percent | 84.8 | 32.5 | | 40 | 99.81 | 70 | 67.5 |
| Wax A (400 cps, .937 g/cc) wt. percent | 10 | 17.5 | | 48 | | | 27.5 |
| Piccotac 115--wt. percent | 5 | 50 | | 12 | | 30 | 5 |
| Viscosity at 350° F. (177° C.) centipoise (grams/(cm · second)) | | 533 | 759 | 725 | 2725 | 1232 | 1202 |
| Close Time (sec) | 15 | 5 | 15 | 10 | | 5 | 15 |
| Open Time (sec) | 20 | 10 | 25 | 15 | | 30 | 15 |
| PAFT (C/mode) | | 92.5/a | 90/a | 87,5/a | | 75/a | 87.5/a |
| DENSITY (g/cm³) | | | 0.917 | | | | |
| Crystallinity (percent) | | 23.5 | 39.80 | 33.1 | 34 | 24.3 | 39.8 |
| PT* - initial (percent) | 97 | 0 | 73 | 50 | 0 | 100 | 25 |
| PT14 - 14 days 50° C. (percent) | 80 | 0 | 98 | 68 | 15 | 100 | 85 |
| PT14 - 14 days at room temperature (percent) | 85 | 0 | 98 | 55 | 0 | 100 | 47 |

*PT refers to Paper Tear

Preferred hot melt adhesives, that is, those which exhibit at least 80 percent initial paper tear, include hot melt adhesives corresponding to the following diagram numbers set forth in Table XIV: 1 and 1C. The hot melt adhesive corresponding to diagram point 1 in Table XIV contains 85 weight percent polymer, 5 weight percent tackifier, and 10 weight percent wax. The hot melt adhesive corresponding to diagram point 1C contains 70 weight percent polymer and 30 weight percent tackifier. Further, the hot melt adhesives corresponding to diagram point 4 in Table XIV, while it did not achieve 80 percent initial paper tear, achieved 100 percent 14 day paper tear, both at room temperature and at 50° C., indicating acceptable performance as a hot melt adhesive of the invention. Further still, the hot melt adhesive corresponding to diagram point 1D in Table E, while it did not achieve 80 percent initial paper tear, achieved 85 percent 14 day paper tear at 50° C., indicating acceptable performance as a hot melt adhesive of the invention. Such pre- 1800 Centipoise (18 grams/(cm.second)) and a Density of 0.860 to Less Than 0.880 g/cm³

The polymers, tackifier, wax, and antioxidant were simultaneously added in the amounts indicated in Table XV to a Haake Rheocord 40 mixer using a 200 gram mixing bowl maintained at about 130° C. at 95 revolutions per minute. The ingredients were mixed for about 5 minutes, until they became molten. The antioxidant employed was Irganox™ 1010 hindered phenolic stabilizer, and was employed in an amount of 2000 ppm, based on the total formulation.

The resultant hot melt adhesives were evaluated for initial, 14 day paper tear at room temperature, and 14 day paper tear at 50° C., close time, open time, and PAFT. The formulations of the hot melt adhesives evaluated, as well as the data obtained, are set forth in Table XV.

TABLE XV

| DIAGRAM # | 1 | 2 | 5 | 6 | 7 | 9 | 10 | 1A | 1B | 1C |
|---|---|---|---|---|---|---|---|---|---|---|
| Sample | 69 | 70 | 71 | 72 | 73 | 74 | 75 | 76 | 77 | 78 |
| Polymer D (1800 cps, .872 g/cc) (wt percent) | 84.83 | 32.5 | 62.41 | 25 | 47.5 | 47.5 | 40 | 100 | 70 | 70 |
| Wax A (400 cps, .937 g/cc) (wt percent) | 9.98 | 17.5 | 9.99 | 47.5 | 47.5 | 38 | 48 | 0 | 30 | 0 |
| Piccotac 115 (wt percent) | 4.99 | 50 | 27.4 | 27.5 | 5 | 14.3 | 12 | 0 | 0 | 30 |
| Viscosity at 350° F. (177° C.) centipoise (grams/(cm · second)) | 1442 (14.4) | 531 (5.31) | 972 (9.72) | 489 (4.89) | 895.5 (89.6) | 782 (7.82) | 765 (7.65) | 1800 (1800) | 1265 (12.7) | 1177 (11.8) |
| Close Time (sec) | 30 | 5 | 20 | 10 | 5 | 20 | 10 | | 20 | 20 |
| Open Time (sec) | 30 | 45 | 40 | 15 | 10 | 10 | 5 | | 15 | 50 |
| PAFT (C/mode) | 90 | 87.5/a | 88 | 102/a | 100/a | 93 | 110/a | | 95/a | 80/c |
| Crystallinity (percent) | | 18.3 | 18 | 29.7 | 38.1 | | 40.3 | 17.1 | 32.3 | 14.7 |
| PT - initial (percent) | 83 | 100 | 100 | 92 | 80 | 98 | 100 | 10 | 100 | 40 |

TABLE XV-continued

| DIAGRAM # | 1 | 2 | 5 | 6 | 7 | 9 | 10 | 1A | 1B | 1C |
|---|---|---|---|---|---|---|---|---|---|---|
| Sample | 69 | 70 | 71 | 72 | 73 | 74 | 75 | 76 | 77 | 78 |
| PT14 - 14 days 50° C. (percent) | 88 | 100 | 100 | 77 | 15 | 99 | 77 | 20 | 50 | 100 |
| PT14 - 14 days at room temperature (percent) | 95 | 100 | 100 | 90 | 90 | 98 | 100 | 25 | 50 | 100 |

*PT refers to Paper Tear

Preferred hot melt adhesives, that is, those which exhibit at least 80 percent initial paper tear, include hot melt adhesives corresponding to the following diagram points in Table XV: 1, 1B, 2, 5, 6, 7, 9, and 10. The data set forth in Table XV demonstrates the utility of hot melt adhesives having the following formulation: 25 to 85 weight percent polymer, 10 to 50 weight percent wax, and 0 to 50 weight percent tackifier, with the proviso that when the tackifier is present in an amount less than 5 weight percent, the polymer is present in an amount greater than 45 weight percent.

More preferred hot melt adhesives, that is, those which exhibit at least 80 percent 14 day room temperature paper tear, include hot melt adhesives represented by the following diagram points in Table XV: 1, 2, 5, 6, 7, 9, 10, and 1C. Such preferred hot melt adhesives will generally have the following formulation: 0 to 50 weight percent wax, 25 to 85 weight percent polymer, and 5 to 50 weight percent tackifier, with the proviso that when the wax is present in an amount less than 10 weight percent, the polymer is present in an amount less than 80 weight percent and more than about 60 weight percent, and when the tackifier is present in an amount greater than 40 weight percent, the polymer is present in an amount greater than 28 weight percent and less than 50 weight percent.

Most preferred hot melt adhesives, that is, those which exhibit at least 80 percent 14 day paper tear at 50° C., include hot melt adhesives represented by the following diagram points in Table XV: 1, 2, 5, 6, 9, 10, and 1C. Such preferred hot melt adhesives will generally have the following formulation: 0 to 50 weight percent wax, 25 to 85 weight percent polymer, and 5 to 50 weight percent tackifier, with the proviso that when the wax is present in an amount less than 10 weight percent, the polymer is present in an amount less than 80 weight percent and more than 60 weight percent, and when the tackifier is present in an amount less than 10 weight percent, the polymer is present in an amount greater than 60 weight percent.

It is notable that, as in the case of the hot melt adhesives of the invention containing a polymer having a density of from 0.865 to less than 0.880 g/cm$^3$ and a melt viscosity at 350° F. (177° C.) of 5000 centipoise (50 grams/(cm.second)), when a polymer having a density of from 0.865 to less than 0.880 g/cm$^3$ is employed, it is expected that the range of acceptable formulation ratios is greatly expanded over the acceptable range when a polymer having a higher density is employed.

Hot Melt Adhesives Comprising a Homogeneous Ethylene Polymer Having a Melt Viscosity at 350° F. (177° C.) of 12,000 Centipoise (120 grams/(cm.second)) and a Density of 0.880 to 0.895 g/cm$^3$ The polymers, tackifier, wax, and antioxidant were simultaneously added in the amounts indicated in Table XVI to a Haake Rheocord 40 mixer using a 200 gram mixing bowl maintained at about 130° C. at 95 revolutions per minute. The ingredients were mixed for about 5 minutes, until they became molten. The antioxidant employed was Irganox™ 1010 hindered phenolic stabilizer, and was employed in an amount of 2000 ppm, based on the total formulation.

The resultant hot melt adhesives were evaluated for initial, 14 day paper tear at room temperature, and 14 day paper tear at 50° C., close time, open time, and PAFT. The formulations of the hot melt adhesives evaluated, as well as the data obtained, are set forth in Table XVI.

TABLE XVI

| DIAGRAM # | 4 | 11 |
|---|---|---|
| Sample | 79 | 80 |
| Polymer E (12300 cps, .893 g/cc) wt. percent | 43.5 | 43.4 |
| Wax A (400 cps, .937 g/cc) wt. percent | 43.5 | 34.7 |
| Piccotac 115, wt. percent | 13 | 21.7 |
| Viscosity at 350° F. (177° C.) centipoise (grams/(cm · second)) | 2260 (22.6) | 2740 (27.4) |
| Close Time (sec) | 5 | 5 |
| Open Time (sec) | 25 | 20 |
| PAFT (C/mode) | 100/c,a | 107.5/c |
| DENSITY (g/cm$^3$) | 0.917 | 0.92 |
| Crystallinity (percent) | 37.60 | 35.60 |
| PT - initial (percent) | 98.00 | 72.00 |
| PT14 -14 days 50° C. (percent) | 98.00 | 58.00 |
| PT14 -14 days at room temperature (percent) | 97 | |

A preferred hot melt adhesive which exhibits at least 80 percent initial paper tear corresponds to diagram point 4 set forth in Table XVI. This hot melt adhesive further exhibits at least 80 percent 14 day paper tear at room temperature and at 50° C. The hot melt adhesive corresponding to diagram point 4 contains 43.5 weight percent polymer, 43.5 weight percent wax, and 13 weight percent tackifier. The hot melt adhesive corresponding to diagram point 11 of Table XVI, while it passed neither the initial paper tear test nor the 14 day paper tear at 50° C. test, passed the 14 day paper tear at room temperature. The hot melt adhesive corresponding to diagram point 4, while it did not achieve 80 percent initial paper tear, it achieved 100 percent 14 day paper tear, both at room temperature and at 50° C., indicating acceptable performance as a hot melt adhesive of the invention. The hot melt adhesive corresponding to diagram point 11 contains 43.4 weight percent polymer, 21.7 weight percent tackifier, and 34.7 weight percent was.

Hot Melt Adhesives Comprising a Homogeneous Ethylene Polymer Having a Melt Viscosity at 350° F. (177° C.) of 23,000 to 25,000 Centipoise (230–250 grams/(cm.second)) and a Density of 0.865 to Less Than 0.880 g/cm$^3$ The polymers, tackifier, wax, and antioxidant were simultaneously added in the amounts indicated in Table XVII to a Haake Rheocord 40 mixer using a 200 gram mixing bowl maintained at about 130° C. at 95 revolutions per minute. The ingredients were mixed for about 5 minutes, until they became molten. The antioxidant employed was Irganox™ 1010 hindered phenolic stabilizer, and was employed in an amount of 2000 ppm, based on the total formulation.

The resultant hot melt adhesives were evaluated for initial, 14 day paper tear at room temperature, and 14 day paper tear at 50° C., close time, open time, and PAFT. The formulations of the hot melt adhesives evaluated, as well as the data obtained, are set forth in Table XVII.

TABLE XVII

| DIAGRAM # | 1 | 5 | 9 |
|---|---|---|---|
| Sample | 81 | 82 | 83 |
| Polymer C2 (25,000 cps, .871 g/cc) (wt percent) | 84.83 | | |
| Polymer C (23,000 cps, .871 g/cc) (wt percent) | | 62.41 | 47.5 |
| Wax A (400 cps, .937 g/cc) (wt percent) | 9.98 | 9.99 | 38 |
| Piccotac 115 (wt percent) | 4.99 | 27.4 | 14.3 |
| Viscosity at 350° F. (177° C.) | 17100 (171) | 8880 | 4440 |

TABLE XVII-continued

| DIAGRAM # | 1 | 5 | 9 |
|---|---|---|---|
| centipoise (grams/(cm · second)) | | (88.8) | (44.4) |
| Close Time (sec) | 5 | 5 | 5 |
| Open Time (sec) | 25 | 50 | 20 |
| PAFT (C/mode) (° C.) | 110/c | 110/c | 110/a |
| PT - initial (percent) | 100 | 100 | 100 |
| PT14 -14 days 50° C. (percent) | 100 | 100 | 100 |
| PT14 -14 days at room temperature (percent) | 100 | 100 | 100 |

*PT refers to Paper Tear

Preferred hot melt adhesives, that is, those which exhibit at least 80 percent initial paper tear, include the hot melt adhesives corresponding to the following diagram points in Table XVII: 1, 5, and 9. Each of the hot melt adhesives corresponding to diagram points 1, 5, and 9 further pass both the 14 day paper tear test at both room temperature and at 50° C. The data set forth in Table XVII demonstrates the utility of hot melt adhesives having the following formulation: 45 to 85 weight percent polymer, 0 to 40 weight percent wax, and 3 to 30 weight percent tackifier. As no further limitations are apparent from the data set forth in Table XVII, it is expected that the range of acceptable formulations will be extended to that reported for the polymers having a density of 0.870 g/cm³ and a melt viscosity at 350° F. (177° C.) of 5000 centipoise (50 grams/(cm.second)), that is, 0 to 50 weight percent wax, 25 to 85 weight percent polymer, and 5 to 50 weight percent tackifier.

Hot Melt Adhesives Comprising a Homogeneous Ethylene Polymer Having a Melt Viscosity at 350° F. of 5,000 Centipoise and a Density of 0.875 to 0.885 g/cm³

The polymers, tackifier, wax, and antioxidant were simultaneously added in the amounts indicated in Table H to a Haake Rheocord 40 mixer using a 200 gram mixing bowl maintained at about 130° C. at 95 revolutions per minute. The ingredients were mixed for 5 minutes, until they became molten. The antioxidant employed was Irganox™ 1010 hindered phenolic stabilizer, and was employed in an amount of 2000 ppm, based on the total formulation.

The resultant HMA's were evaluated for initial, 14 day paper tear at room temperature, and 14 day paper tear at 50° C., close time, open time, and PAFT. The formulations of the HMA's evaluated, as well as the data obtained, are set forth in Table XVIII.

TABLE XVIII

| DIAGRAM # | 1 | 2 | 4 | 6 | 7 | 8 | 11 | 1A | 1B | 1C |
|---|---|---|---|---|---|---|---|---|---|---|
| Sample No. | 84 | 85 | 86 | 87 | 88 | 89 | 90 | 91 | 92 | 93 |
| 5000 cps, .88 (wt percent) | 85.0 | 32.5 | 43.4 | 25.0 | 47.5 | 49.9 | 43.5 | 100.0 | 70.0 | 70.0 |
| Wax A (400 cps, 0.93 g/cm3) (wt percent) | | 17.5 | 43.4 | 47.5 | 47.5 | 49.9 | 35.0 | | 30.0 | |
| Piccotac 115 (wt percent) | 5.0 | 50.0 | 13.0 | 27.5 | 4.8 | 0.0 | 21.5 | | | 30.0 |
| Viscosity at 350° F. (177° C.) cps (grams/(cm · second) | 3822 | 782 | 1300 | 666 | 1530 | 1455 | 1220 | | 2610 | 2610 |
| Close Time (sec) | 20.0 | 5.0 | 5.0 | 5.0 | 5.0 | 5.0 | 5.0 | 40.0 | — | 10.0 |
| Open Time (sec) | 20.0 | 25.0 | 25.0 | 15.0 | 15.0 | | 10.0 | 20.0 | — | 50.0 |
| PAFT (Cmode) (° C.) | 75/a | 87.5/a | 107.5/a | 105/a | 80/a | 95/a | 112.5/a | 60/a | 100/a | 90/c |
| DENSITY g/cc | | | 0.913 | | 0.907 | 0.904 | | | | |
| CRYSTALLINITY (percent) | 26.3 | 19.8 | 35.6 | 25.7 | 40.0 | 46.1 | 32.9 | 25.4 | 37.2 | 16.6 |
| PT - initial (percent) | 100 | 100 | 7 | 20 | 73 | 0 | 100 | 28 | 10 | 100 |
| PT14 - 14 days 50C (percen | 100 | 0 | 64 | 0 | 82 | 18 | 71 | 35 | 15 | 100 |
| PT14 - 14 days at room temperature (percent) | 91 | 11 | 69 | 28 | 92 | 18 | 100 | 41 | 0 | 100 |

Preferred hot melt adhesives, that is, those which exhibit at least 80 percent initial paper tear, include hot melt adhesives corresponding to the following diagram points in Table XVIII: 1, 2, 11, and 1C. The data set forth in Table XVIII demonstrates the utility of hot melt adhesives having the following formulation: 30 to 85 weight percent polymer, 0 to 35 weight percent wax, and 5 to 50 weight percent tackifier, with the proviso that when the tackifier is present in an amount less than 10 weight percent, the polymer is present in an amount greater than 70 weight percent, and when the tackifier is present in an amount greater than 35 weight percent, the polymer is present in an amount greater than 35 weight percent and less than 60 weight percent.

More preferred hot melt adhesives, that is, those which exhibit at least 80 percent 14 day room temperature paper tear, include hot melt adhesives represented by the following diagram points in Table XVIII: 1, 7, 11, and 1C. Such preferred hot melt adhesives will generally have the following formulation: 0 to 50 weight percent wax, 45 to 85 weight percent polymer, and 5 to 30 weight percent tackifier, with the proviso that when the wax is present in an amount less than 5 weight percent, the polymer is present in an amount less than about 80 weight percent and more than about 65 weight percent.

Most preferred hot melt adhesives, that is, those which exhibit at least 80 percent 14 day paper tear at 50° C., include hot melt adhesives represented by the following diagram points in Table XVIII: 1, 7, and 1C. Such preferred hot melt adhesives will generally have the following formulation: 0 to 50 weight percent wax, 45 to 85 weight percent polymer, and 5 to 30 weight percent tackifier, with the proviso that when the tackifier is present in an amount more than 20 weight percent, the polymer is present in an amount less than 75 weight percent and more than 60 weight percent.

These and other embodiments will be readily ascertained by one skilled in the art. Accordingly, the subject invention is to be limited only by the following claims.

What is claimed is:

1. A carton, case or tray utilizing a hot melt adhesive comprising:
   a) at least one homogeneous linear or substantially linear interpolymer of ethylene with at least one $C_3$–$C_{20}$ α-olefin interpolymer having a density from 0.850 g/cm$^3$ to 0.895 g/cm$^3$;
   b) up to about 60 wt-% of at least one tackifying resin; and
   c) up to about 40 wt-% of at least one wax;
wherein the hot melt adhesive has a viscosity of less than 5000 centipoise at 150° C. and can be applied at temperatures of less than about 150° C.

2. A package comprising at least one substrate bonded with a hot melt adhesive comprising:
   a) at least one homogeneous linear or substantially linear interpolymer of ethylene with at least one $C_3$–$C_{20}$ α-olefin interpolymer having a density from 0.850 g/cm$^3$ to 0.895 g/cm$^3$;
   b) up to about 60 wt-% of at least one tackifying resin; and
   c) up to about 40 wt-% of at least one wax;
wherein the hot melt adhesive has a viscosity of less than 5000 centipoise at 150° C.

3. A package comprising at least one substrate bonded with a hot melt adhesive comprising:
   a) at least one homogeneous linear or substantially linear interpolymer of ethylene with at least one $C_3$–$C_{20}$ α-olefin interpolymer having a density from 0.850 g/cm$^3$ to 0.895 g/cm$^3$;
   b) up to about 60 wt-% of at least one tackifying resin; and
   c) up to about 40 wt-% of at least one wax;
wherein the homogeneous linear or substantially linear interpolymer of the adhesive has a viscosity from 2000 centipoise to 18000 centipoise.

4. The package of claim 3 wherein the homogeneous linear or substantially linear interpolymer of the adhesive has a viscosity from 8000 centipoise to 15000 centipoise.

5. A package comprising at least one substrate bonded with a hot melt adhesive comprising:
   a) at least one homogeneous linear or substantially linear interpolymer of ethylene with at least one $C_3$–$C_{20}$ α-olefin interpolymer having a density less than 0.875 g/cm$^3$;
   b) up to about 60 wt-% of at least one tackifying resin; and
   c) up to about 40 wt-% of at least one wax.

6. The package of claim 2 wherein the tackifying resin of the adhesive is a hydrocarbon based tackifying resin.

7. The package of claim 2 wherein the wax of the adhesive is selected from the group consisting of polyethylene waxes, by-product polyethylene waxes, Fischer-Tropsch waxes, homogeneous waxes, and mixtures thereof.

8. The package of claim 2 wherein the 100 gram peel adhesion failure temperature value is greater than 40° C.

9. The package of claim 2 wherein the viscosity of the adhesive is less than 2,000 centipoise at 150° C.

10. A package comprising at least one substrate bonded with a hot melt adhesive comprising:
    a) at least one homogeneous linear interpolymer of ethylene with at least one $C_3$–$C_{20}$ α-olefin interpolymer having a density from 0.850 g/cm$^3$ to 0.895 g/cm$^3$;
    b) up to about 60 wt-% of at least one tackifying resin; and
    c) up to about 40 wt-% of at least one wax;
wherein the melt index of the interpolymer of the adhesive ranges from 500 g/10 min. to 2000 g/10 min.

11. The package of claim 2 wherein the melt index of the interpolymer of the adhesive ranges from 500 g/10 min. to 1500 g/10 min.

12. The carton, case or tray of claim 1 wherein the homogeneous linear or substantially linear interpolymer of the adhesive has a number average molecular weight less than about 11,000.

13. The carton, case or tray of claim 1 wherein the homogeneous linear or substantially linear interpolymer of the adhesive is a copolymer of ethylene and 1-octene.

14. The carton, case or tray of claim 13 wherein the 1-octene comprises at least about 31 wt-% of the homogeneous linear or substantially linear interpolymer.

15. The package of claim 2 wherein the homogeneous linear or substantially linear interpolymer has a number average molecular weight less than about 11,000.

16. The package of claim 2 wherein the homogeneous linear or substantially linear interpolymer is a copolymer of ethylene and 1-octene.

17. The package of claim 16 wherein 1-octene is at least about 31 wt % of the homogeneous linear or substantially linear interpolymer.

18. A carton, case or tray utilizing a hot melt adhesive comprising:
    (a) at least one homogeneous linear or substantially linear interpolymer of ethylene and 1-octene wherein the 1-octene comonomer content of the interpolymer is greater than 31% by weight in the polymer as measured by NMR in accordance with ASTM D-5017, the number average molecular weight of the interpolymer is no more than 11,000 having a density from 0.850 gm/cm$^3$ to 0.895 gm/cm$^3$;
    (b) up to about 60 wt % of at least one tackifying resin; and
    (c) up to about 40 wt % of at least one wax;
wherein the hot melt adhesive has a viscosity of less than 5,000 centipoise at 150° C. and can be applied at temperatures of less than about 150° C.

19. The package of claim 2 wherein component (a) of the adhesive comprises at least two homogeneous ethylene/α-olefin interpolymers, at least one of which has a density from 0.850 g/cm$^3$ to 0.885 g/cm$^3$, wherein the density of the blend ranges from 0.850 g/cm$^3$ to 0.895 g/cm$^3$.

20. The package of claim 2 wherein said interploymer of ethylene has a density of from about 0.850 g/cm$^3$ to about 0.885 g/cm$^3$.

* * * * *